(12) United States Patent
Kato

(10) Patent No.: US 8,576,431 B2
(45) Date of Patent: Nov. 5, 2013

(54) DEVICE MANAGEMENT USING POWER SUPPLY STATUS

(75) Inventor: Kazunori Kato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 13/040,230

(22) Filed: Mar. 3, 2011

(65) Prior Publication Data

US 2011/0235108 A1    Sep. 29, 2011

(30) Foreign Application Priority Data

Mar. 25, 2010   (JP) .................................. 2010-070855

(51) Int. Cl.
*G06F 15/00*     (2006.01)
*G06F 3/12*      (2006.01)
*G06K 1/00*      (2006.01)

(52) U.S. Cl.
USPC ........................................ 358/1.15; 358/1.13

(58) Field of Classification Search
None
See application file for complete search history.

(56) References Cited

U.S. PATENT DOCUMENTS

| | | | |
|---|---|---|---|
| 4,759,965 A | 7/1988 | Kato et al. | 428/138 |
| 6,952,747 B2 | 10/2005 | Fujiwara et al. | 710/110 |
| 7,380,034 B2 | 5/2008 | Fujiwara et al. | 710/116 |
| 7,574,612 B2 * | 8/2009 | Ookawa | 713/300 |

FOREIGN PATENT DOCUMENTS

JP    2006-120003    5/2006

* cited by examiner

*Primary Examiner* — Douglas Tran
(74) *Attorney, Agent, or Firm* — Fitzpatrick, Cella, Harper & Scinto

(57) ABSTRACT

A device management system of the present invention, in which a device which is allowed to shift to a power saving mode and a management apparatus which manages the device are connected to a network, allows the management apparatus to recognize power consumption statuses of devices without making any periodic communications between the management apparatus and devices.

19 Claims, 24 Drawing Sheets

FIG. 7A

| MFP ID | NOTIFICATION TYPE | TIME | TIME PERIOD UNTIL POWER SAVING MODE SHIFT | |
|---|---|---|---|---|
| MFP A | ACTIVE | 2009/9/26 10:10 | 500 | ~1311 |
| MFP B | POWER ON | 2009/9/26 10:05 | 600 | ~1312 |
| MFP C | POWER SAVING SHIFT | 2009/9/26 10:05 | - | ~1313 |

FINAL STATUS NOTIFICATION TABLE

FIG. 7B

| MFP ID | TIME | STATUS | |
|---|---|---|---|
| MFP A | 2009/9/26 9:00 | NORMAL MODE | ~1411 |
| MFP A | 2009/9/26 9:20 | POWER SAVING MODE | ~1412 |
| MFP A | 2009/9/26 9:30 | NORMAL MODE | ~1413 |
| ... | | | |
| MFP B | 2009/9/26 9:00 | NORMAL MODE | ~1414 |
| MFP B | 2009/9/26 9:20 | POWER SAVING MODE | ~1415 |
| MFP B | 2009/9/26 9:30 | NORMAL MODE | ~1416 |
| MFP B | 2009/9/26 9:50 | POWER OFF | ~1417 |
| ... | | | |
| MFP C | 2009/9/26 9:00 | NORMAL MODE | ~1418 |
| MFP C | 2009/9/26 9:50 | POWER SAVING MODE | ~1419 |
| ... | | | |

POWER SUPPLY STATUS LOG TABLE

FIG. 8A

| NOTIFICATION TYPE 1201 | PRE-STATUS CONDITION 1202 | POST-STATUS 1203 | NORMAL MODE DURATION 1204 |
|---|---|---|---|
| POWER ON | POWER OFF | NORMAL MODE | 0 | 1211
| POWER OFF | NORMAL MODE POWER SAVING MODE | POWER OFF | 0 | 1212
| POWER SAVING SHIFT | NORMAL MODE | POWER SAVING MODE | <POWER SAVING MODE SHIFT TIME-OUT> | 1213
| POWER SAVING CANCEL | POWER SAVING MODE | NORMAL MODE | 0 | 1214
| ACTIVE | NORMAL MODE | NORMAL MODE | <POWER SAVING MODE SHIFT TIME-OUT> | 1215
| JOB EXECUTION | NORMAL MODE | NORMAL MODE | 0 | 1216

STATUS TRANSITION CONDITION TABLE   SECOND EMBODIMENT

FIG. 8B

| JOB LOG ID 701 | MFP ID 702 | JOB TYPE 703 | START TIME 704 | END TIME 705 | NUMBER OF COLOR PAGES 706 | NUMBER OF MONOCHROME PAGES 707 | NUMBER OF SCAN PAGES 708 |
|---|---|---|---|---|---|---|---|
| 1000 | MFP A | COPY | 2009/9/25 14:25 | 2009/9/25 14:40 | 10 | 0 | 10 |
| 1001 | MFP A | SCAN | 2009/9/26 9:01 | 2009/9/26 9:01 | 0 | 0 | 3 |
| 1002 | MFP A | COPY | 2009/9/26 9:10 | 2009/9/26 9:10 | 1 | 0 | 1 |
| 1003 | MFP C | PRINT | 2009/9/26 10:12 | 2009/9/26 10:13 | 5 | 10 | 0 |

JOB LOG INFORMATION TABLE

FIG. 9A

| STATUS | 12a | 1a | 2a | 3a | 4a | 5a | 6a | 7a | 8a | 9a | 10a | 11a | 12p | 1p | 2p | 3p | 4p | 5p | 6p | 7p | 8p | 9p | 10p | 11p |
|---|---|---|---|---|---|---|---|---|---|---|---|---|---|---|---|---|---|---|---|---|---|---|---|---|
| JOB PROCESSING | 0 | 0 | 0 | 0 | 0 | 0 | 0 | 0 | 5 | 10 | 12 | 15 | 5 | 20 | 13 | 17 | 10 | 18 | 6 | 5 | 2 | 0 | 0 | 0 |
| NORMAL MODE | 0 | 0 | 10 | 80 | 80 | 80 | 80 | 80 | 40 | 55 | 68 | 75 | 65 | 61 | 57 | 58 | 70 | 62 | 69 | 35 | 15 | 5 | 0 | 0 |
| POWER SAVING MODE | 80 | 80 | 70 | 20 | 20 | 20 | 20 | 20 | 50 | 30 | 10 | 5 | 25 | 14 | 25 | 20 | 15 | 15 | 20 | 60 | 73 | 80 | 85 | 80 |
| POWER OFF | 20 | 20 | 20 | 0 | 0 | 0 | 0 | 0 | 5 | 5 | 10 | 5 | 5 | 5 | 5 | 5 | 5 | 5 | 5 | 5 | 10 | 15 | 15 | 20 |
| POWER CONSUMPTION CORRECTION AMOUNT | 0 | 0 | 0 | 0 | 0 | 0 | 0 | 0 | 4 | 6 | 45 | 69 | 5 | 45 | 88 | 60 | 37 | 77 | 23 | 12 | 4 | 0 | 0 | 0 |

POWER SUPPLY STATUS RATIO TABLE

SECOND EMBODIMENT

FIG. 9B

| MFP ID | NORMAL MODE | POWER SAVING MODE | JOB PROCESSING | POWER OFF |
|---|---|---|---|---|
| MFP A | 100 | 1 | 1000 | 0 |
| MFP B | 130 | 3 | 1200 | 0 |
| MFP C | 120 | 1 | 1100 | 0 |
| MFP D | 100 | - | 0 | - |

POWER CONSUMPTION TABLE

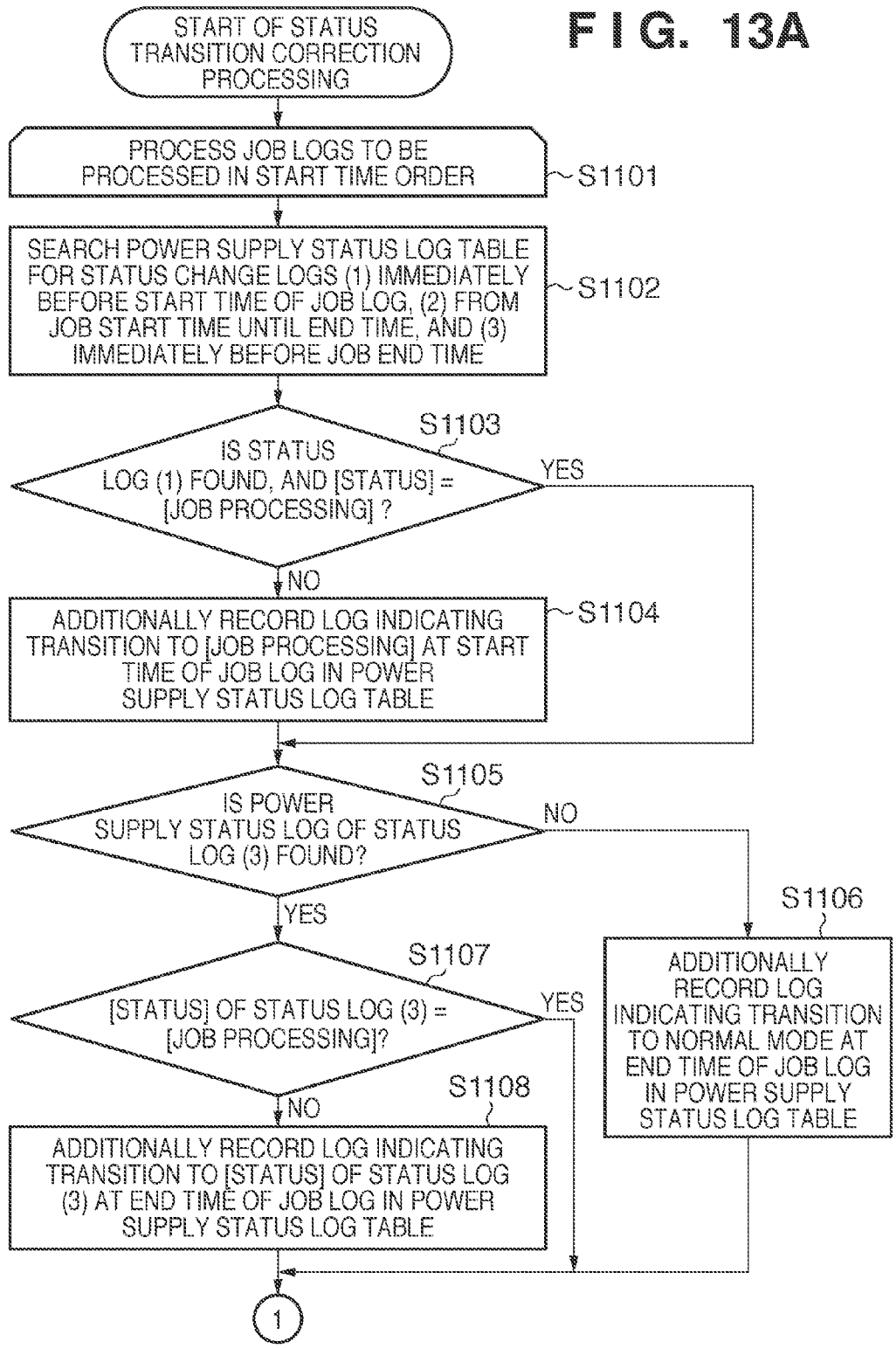

F I G. 16A

| MFP ID | TIME | STATUS | COLOR PRINT | MONOCHROME PRINT | SCAN |
|---|---|---|---|---|---|
| MFP A | 2009/9/26 9:00 | NORMAL MODE | | | |
| MFP A | 2009/9/26 9:01 | JOB PROCESSING | | | 3 |
| MFP A | 2009/9/26 9:01 | NORMAL MODE | | | |
| MFP A | 2009/9/26 9:10 | JOB PROCESSING | 1 | | 1 |
| MFP A | 2009/9/26 9:10 | NORMAL MODE | | | |
| MFP A | 2009/9/26 9:20 | POWER SAVING MODE | | | |
| MFP A | 2009/9/26 9:30 | NORMAL MODE | | | |
| ... | | | | | |

POWER SUPPLY STATUS LOG TABLE

F I G. 16B

| MFP ID | POWER SUPPLY STATUS NOTIFICATION FUNCTION | POWER SAVING MODE SHIFT TIME-OUT (SEC) | MONOCHROME PRINT SPEED (PAGES / MIN) | COLOR PRINT SPEED (PAGES / MIN) |
|---|---|---|---|---|
| MFP A | AVAILABLE | 6000 | 30 | 25 |
| MFP B | AVAILABLE | 6000 | 100 | 100 |
| MFP C | AVAILABLE | 9000 | 20 | |
| MFP D | NOT AVAILABLE | | 20 | 20 |

DEVICE INFORMATION TABLE

FIG. 17A

POWER CONSUMPTION TABLE

| MFP ID | NORMAL MODE | POWER SAVING MODE | PRINT JOB PROCESSING | PRINT-LESS JOB PROCESSING | POWER OFF |
|---|---|---|---|---|---|
| MFP A | 100 | 1 | 1000 | 100 | 0 |
| MFP B | 130 | 3 | 1200 | 120 | 0 |
| MFP C | 120 | 1 | 1100 | 110 | 0 |
| MFP D | 100 | – | 0 | 0 | – |
| ... | | | | | |

POWER CONSUMPTION CORRECTION TABLE

| MFP ID | PRINT FIRST PAGE (Wh) | COLOR PRINT (Wh / PAGE) | MONOCHROME PRINT (Wh / PAGE) | SCAN (Wh / PAGE) |
|---|---|---|---|---|
| MFP A | 2 | 1 | 1.5 | 0.2 |
| MFP B | 4 | 3 | 3 | 0.2 |
| MFP C | 4 | 2 | 3 | 0.2 |
| MFP D | 2 | 1 | 1.5 | 0.5 |
| ... | | | | |

↑2101 ↑2102 ↑2103 ↑2104 ↑2105
↑2111 ↑2112 ↑2113 ↑2114

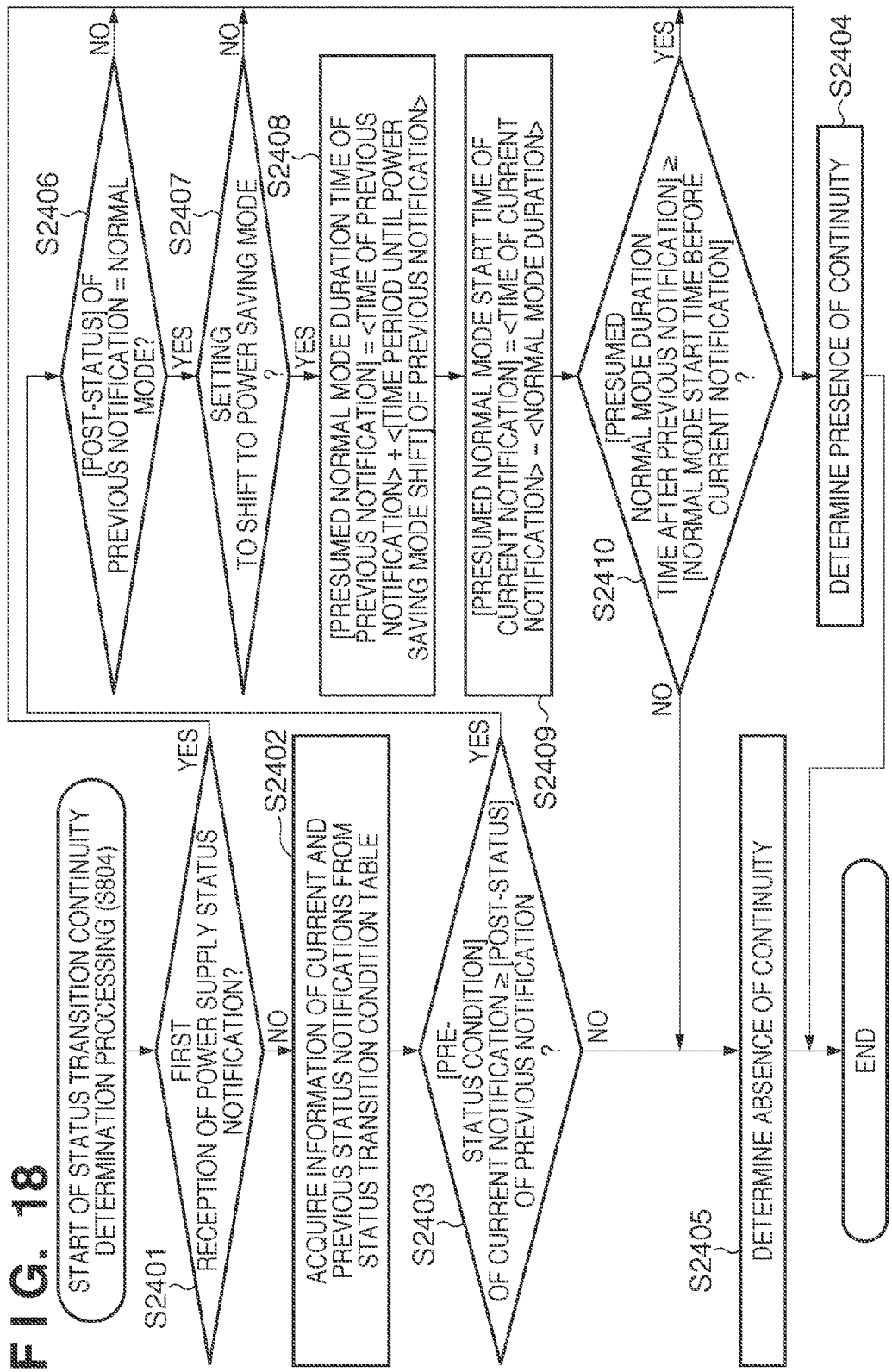

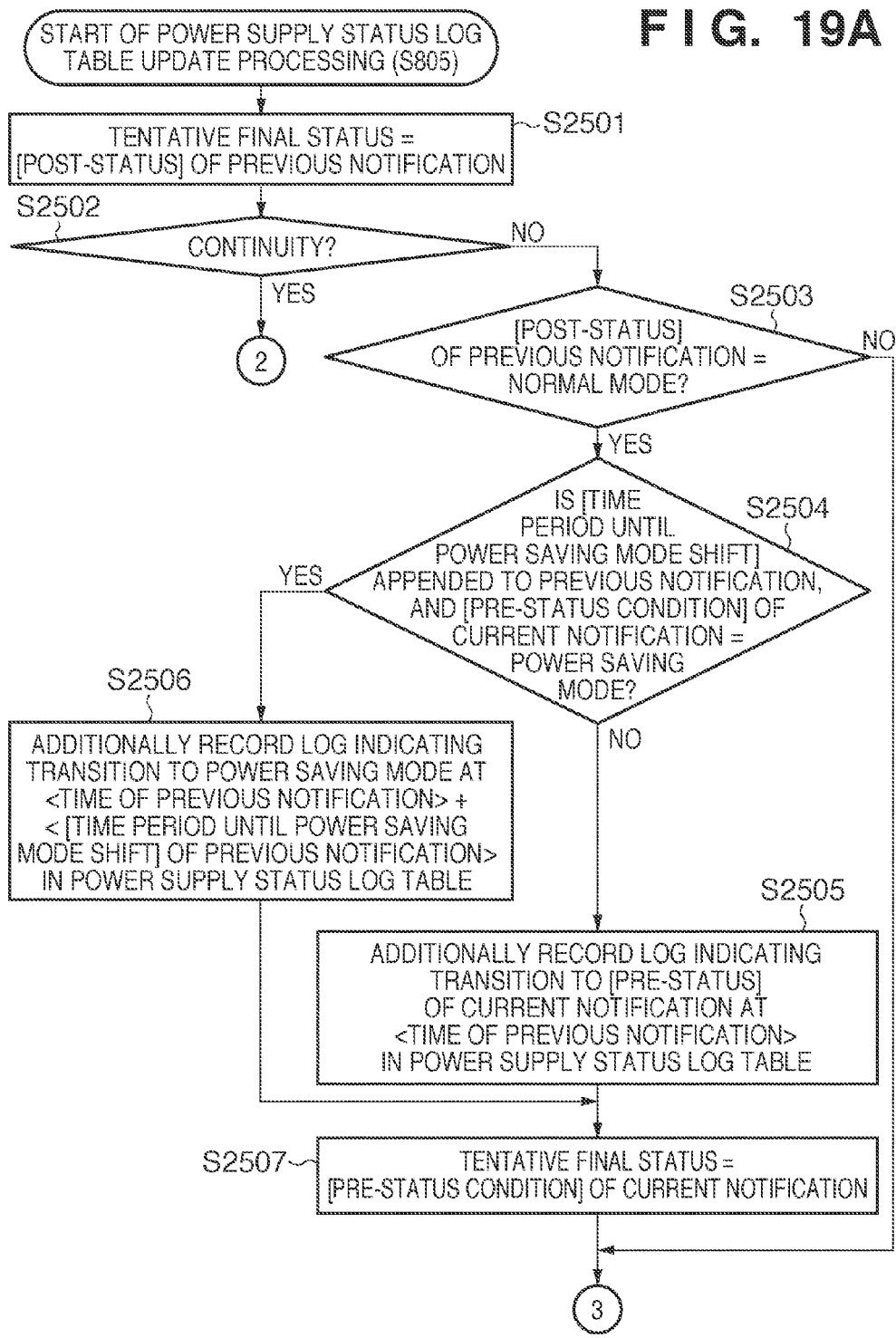

DEVICE MANAGEMENT USING POWER SUPPLY STATUS

BACKGROUND OF THE INVENTION

1. Field of the Invention

The present invention relates to a device management system which manages operating statuses of devices, a management apparatus, a device management method, and a program.

2. Description of the Related Art

In recent years, in order to reduce emissions of greenhouse gases such as carbon dioxide, the amount of power consumption at the time of use of devices such as printers and multifunction peripherals (MFPs) are required to be reduced. For this purpose, it is required to allow users to recognize the power consumption amounts at the time of use of devices (that is, to "visualize" the power consumptions). For example, Japanese Patent Laid-Open No. 2006-120003 (reference 1) discloses the following technique. That is, in a system including a plurality of copying machines connected to a network, since each copying machine consumes electrical power due to energization when it is in a communication ready state, a time period of the communication ready state is calculated with reference to a monitor log, a power consumption of each copying machine is calculated based on the calculated time period, and the calculated power consumption value is output. According to this technique, since, for example, monthly logs of power consumption amounts of respective copying machines can be recognized, when a power consumption of this month of a certain copying machine becomes larger than previous months, the furtherance of power savings can be evoked for respective users of an office.

However, with the system described in reference 1, since a management apparatus attempts to communicate with devices to determine whether or not each device is in a communication ready state, power consumption amounts that consider more detailed device statuses cannot be calculated. Since the management apparatus periodically attempts to communicate with devices, a communication load is heavy. Furthermore, this communication may often awake the device from a power saving mode to a normal mode, and an environment load becomes heavier in this case.

SUMMARY OF THE INVENTION

The present invention has been made in consideration of the aforementioned problems, and provides a device management system which allows a management apparatus to recognize power consumption statuses of devices without making any periodic communications between the management apparatus and devices, a management apparatus, a device management method, and a program.

According to one aspect of the present invention, there is provided a device management system in which a device which is allowed to shift to a power saving mode and a management apparatus which manages the device are connected to a network, the system comprises: a power supply status notification unit configured to notify the management apparatus of a power supply status including information indicating whether or not a power supply of the device is ON and information indicating whether or not an operation mode of the device is a power saving mode; a power supply status monitoring unit configured to identify, based on a power supply status notification received from the device, a time at which the power supply of the device shifted to a different status and a time at which the operation mode of the device shifted to a different mode; a power supply status log recording unit configured to record, in a first memory, a power supply status log including the shift time to the different state or the different operation mode and a power supply status after the shift time; a job log recording unit at the device configured to record, in a second memory, a job log including a start time and an end time of a job executed by the device; a job log collection unit configured to be arranged in the management apparatus and issue a job log acquisition request to the device; a job log sending unit configured to send job log information recorded in the second memory to the management apparatus in response to the job log acquisition request from the management apparatus; and an update unit configured to additionally record, in the first memory, a log indicating that a status shifted to a status of job processing at the start time of the job and shifted to a status before the start time of the job at the end time of the job.

According to another aspect of the present invention, there is provided a management apparatus which is connected, via a network, to a device comprising a job log recording unit configured to record, in a first memory, a job log including a start time and an end time of an executed job, and manages the device, the apparatus comprises: a power supply status monitoring unit configured to receive, from the device, a power supply status notification indicating a power supply status including information indicating whether or not a power supply of the device is ON and information indicating whether or not an operation mode of the device is a power saving mode, and to identify a time at which the power supply of the device shifted to a different status and a time at which the operation mode of the device shifted to a different mode; a power supply status log recording unit configured to record, in a second memory, a power supply status log including the shift time to the different status or the different operation mode and a power supply status after the shift time; a job log collection unit configured to collect job logs recorded in the first memory by issuing a job log acquisition request to the device; and an update unit configured to additionally record, in the second memory, a log indicating that a status shifted to a status of job processing at a start time of the job, and shifted to a status before the start time of the job at an end time of the job.

According to another aspect of the present invention, there is provided a management apparatus which is connected, via a network, to a device which is allowed to shift to a power saving mode, and manages the device, the apparatus comprises: a recording unit configured to acquire, from the device, a power supply status including information indicating whether or not a power supply of the device is ON and information indicating whether or not an operation mode of the device is a power saving mode, and to record, in a memory, a power supply status log including a time at which the power supply of the device shifted to a different status or a time at which the operation mode of the device shifted to a different mode and a power supply status after the shift time; and an update unit configured to acquire, from the device, a job log including a start time and an end time of a job executed by the device, and to additionally record, in the memory, a log indicating that a status shifted to a status of job processing at the start time of the job and shifted to a status before the start time of the job at the end time of the job.

According to another aspect of the present invention, there is provided a device management method of a device management system in which a device which is allowed to shift to a power saving mode and a management apparatus which manages the device are connected to a network, the method comprises: a power supply status notification step of notifying the management apparatus of a power supply status including information indicating whether or not a power supply of the device is ON and information indicating whether or not an operation mode of the device is a power saving mode; a power supply status monitoring step of identifying, based on a power supply status notification received from the device, a time at which the power supply of the device shifted to a different status and a time at which the operation mode of the device shifted to a different mode; a power supply status log recording step of recording, in a first memory, a power supply status log including the shift time to the different state or the different operation mode and a power supply status after the shift time; a job log recording step of recording, in a second memory at the device, a job log including a start time and an end time of a job executed by the device; a job log collection step of issuing a job log acquisition request to the device; a job log sending step of sending job log information recorded in the second memory to the management apparatus in response to the job log acquisition request from the management apparatus; and an update step of additionally recording, in the first memory, a log indicating that a status shifted to a status of job processing at the start time of the job and shifted to a status before the start time of the job at the end time of the job.

According to another aspect of the present invention, there is provided a computer-readable storage medium storing a program for controlling a computer to function, in a device management system in which a device which is allowed to shift to a power saving mode and a management apparatus which manages the device are connected to a network, as: a power supply status notification unit configured to notify the management apparatus of a power supply status including information indicating whether or not a power supply of the device is ON and information indicating whether or not an operation mode of the device is a power saving mode; a power supply status monitoring unit configured to identify, based on a power supply status notification received from the device, a time at which the power supply of the device shifted to a different status and a time at which the operation mode of the device shifted to a different mode; a power supply status log recording unit configured to record, in a first memory, a power supply status log including the shift time to the different state or the different operation mode and a power supply status after the shift time; a job log recording unit configured to record, in a second memory at the device, a job log including a start time and an end time of a job executed by the device; a job log collection unit configured to issue a job log acquisition request to the device; a job log sending unit configured to send job log information recorded in the second memory to the management apparatus in response to the job log acquisition request from the management apparatus; and an update unit configured to additionally record, in the first memory, a log indicating that a status shifted to a status of job processing at the start time of the job and shifted to a status before the start time of the job at the end time of the job.

According to the present invention, a device management system which allows a management apparatus to recognize power consumption statuses of devices without making any periodic communications between the management apparatus and devices, a management apparatus, a device management method, and a program can be provided.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7A shows an example of a final status notification table;

FIG. 7B shows an example of a power status log table;

FIG. 8A shows an example of a status transition condition table;

FIG. 8B shows an example of a job log information table;

FIG. 9A shows an example of a power supply status ratio table;

FIG. 9B shows an example of a power consumption table;

FIGS. 13A and 13B are flowcharts showing the processing sequence of status transition correction processing based on job logs;

FIG. 16A shows an example of a power supply status log table according to the second embodiment of the present invention;

FIG. 16B shows an example of a device information table;

FIG. 17A shows an example of a status-dependent power consumption table;

FIG. 17B shows an example of a power consumption correction table;

FIG. 18 is a flowchart showing the detailed processing sequence of status transition continuity determination processing (S804);

FIGS. 19A and 19B are flowcharts showing the detailed processing sequence of power supply status log table update processing (S805);

DESCRIPTION OF THE EMBODIMENTS

Embodiments of the present invention will be described in detail hereinafter with reference to the drawings. Note that the following embodiments do not intend to limit the scope of the claims, and all combinations of characteristic features described in the embodiments are not always mandatory to the solving means of the invention.

<First Embodiment>

Figure 1:
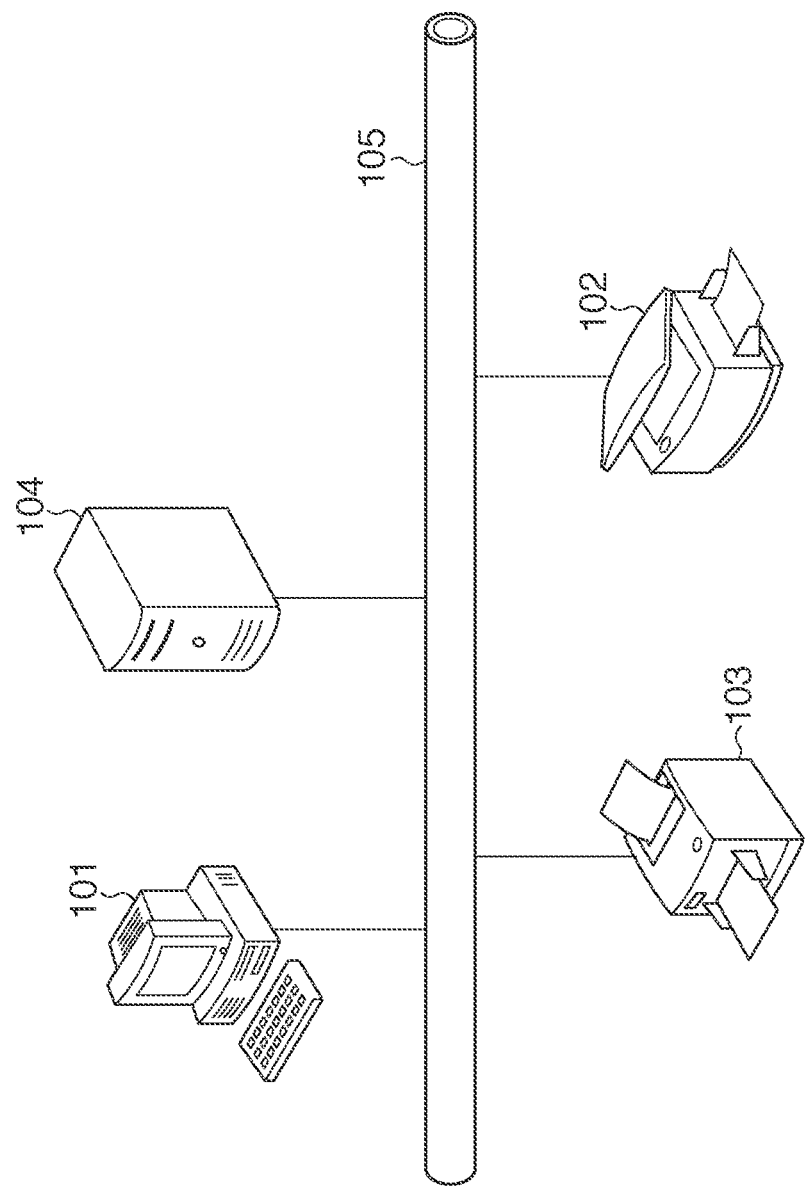
FIG. 1 is a view showing the arrangement of a device management system according to the first embodiment of the present invention.

[Overall Arrangement of Device Management System (FIG. 1)]

A device management system includes a host computer 101, MFPs (multi-function peripherals) 102 and 103, and analysis server 104. The host computer 101, MFPs 102 and 103, and analysis server 104 are connected via a network 105 based on a given technique such as Ethernet to be able to communicate with each other.

The host computer 101 is used by the user to generate image data, and to input, for example, a print instruction. The MFPs 102 and 103 are devices which receive print data via the network 105, and print images on actual sheets using given print techniques such as an electrophotography technique and ink-jet technique. The MFPs 102 and 103 have functions of copying a paper document by reading it via a scanner, and converting the read image into image data to send the image data via E-mail. The MFPs 102 and 103 may be devices which have no scanner function and have only a printer function. The analysis server 104 performs power consumption analysis of the MFPs 102 and 103.

Note that in this embodiment, the analysis server 104 is arranged independently of the MFPs 102 and 103, but a module having the same function as the analysis server 104 may be arranged in the MFPs 102 and 103. In this case, network communications made between the analysis server 104 and MFPs 102 and 103 can be replaced by data exchange via, for example, a system bus.

[Arrangement of Host Computer 101]

(Internal Arrangement (FIG. 2))

The host computer 101 includes a CPU 201 which executes software stored in a ROM 202 or a hard disk 211 as a large-capacity storage device. The CPU 201 systematically controls respective devices connected to a system bus 204. A RAM 203 serves as, for example, a main memory and work area of the CPU 201. A keyboard controller (KBDC) 205 controls instruction inputs from a keyboard 209 included in the host computer 101. A display controller (DISPC) 206 controls display processing of a display module (DISPLAY) 210 which includes, for example, a liquid crystal display. A disk controller (DKC) 207 controls the hard disk 211. A network interface card (NIC) 208 exchanges data with another node in two ways via the network 105.

Figure 3:
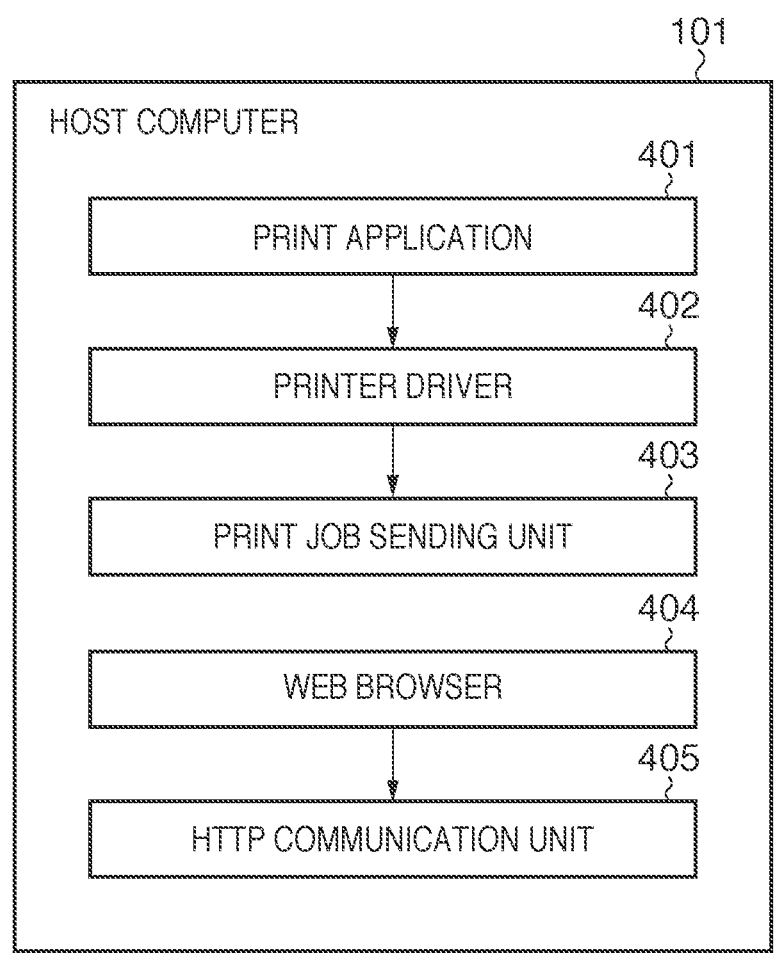
FIG. 3 is a block diagram showing the functional arrangement of the host computer 101.

(Functional Arrangement (FIG. 3))

The host computer 101 includes a print application 401, printer driver 402, print job sending unit 403, Web browser 404, and HTTP communication unit 405. The print application 401 issues a print instruction by sending, for example, a rendering command to the printer driver 402. The printer driver 402 converts, for example, the rendering command received from the print application 401 into interpretable print data of the MFP, that is, PDL (Page Description Language) data. Furthermore, when device authentication is set, the printer driver 402 displays a user authentication dialog, and prompts the user to input a user name and password required to use the MFP. The printer driver 402 sends the input user name and password to the MFP as a print destination via the network 105, thereby issuing an authentication request. The MFP collates the user name and password using an authentication processor 612 (to be described later), and returns a success or failure result of authentication. When the authentication has failed, the printer driver 402 cancels print processing; when the authentication has succeeded, it creates a print job by appending the input user name to the print job as job owner information. On the other hand, when no device authentication is set, the printer driver 402 creates a print job by appending a name of the user who has logged on to the host computer 101 as job owner information to the print job. Then, the printer driver 402 sends the created print job data to the print job sending unit 403. The print job sending unit 403 sends the print job received from the printer driver 402 to the MFP. The Web browser 404 interprets HTML data to render a screen on the display module 210, and accepts a user operation from, for example, the keyboard to send a request to the HTTP communication unit 405. The HTTP communication unit 405 makes a communication with, for example, an image processing apparatus via the NIC 208 using an HTTP or HTTPS protocol in response to the communication request from the Web browser, thus sending a Web page request and receiving Web page data.

[Arrangement of Analysis Server 104]

(Internal Arrangement)

Figure 2:
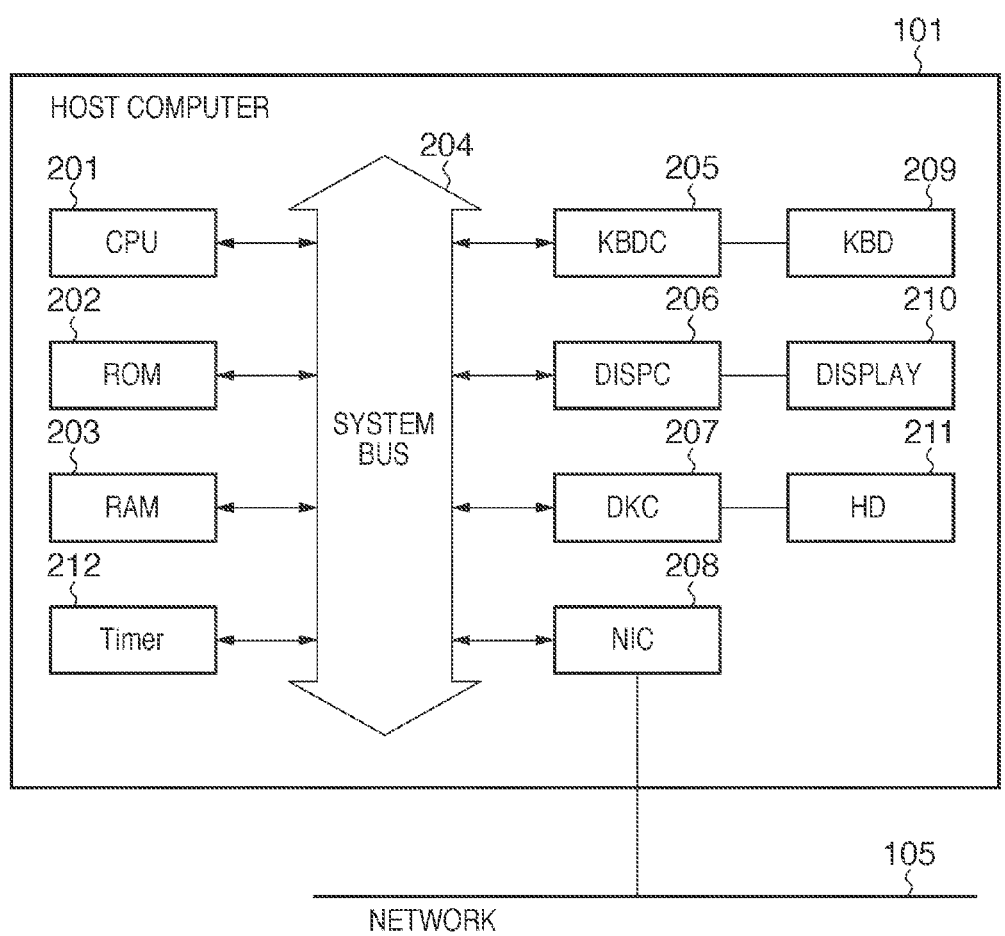
FIG. 2 is a block diagram showing the internal arrangement of a host computer 101.

The internal arrangement is the same as that of the host computer 101 (see FIG. 2).

(Functional Arrangement (FIG. 4))

The analysis server 104 includes an interface unit 501, analysis processor 502, job log collection unit 503, power supply status monitoring unit 504, and device information management unit 505. The interface unit 501 communicates with the MFPs 102 and 103 via the NIC 208 and network 105. The analysis processor 502 executes power consumption analysis processing of the MFPs based on job logs and power supply status logs. The job log collection unit 503 collects job logs from the MFPs 102 and 103 via the interface unit 501, and stores the collected job logs. The power supply status monitoring unit 504 receives power supply status notifications from the MFPs 102 and 103 via the interface unit 501, and creates and stores power supply status logs. The device information management unit 505 (device information acquisition unit) acquires information such as capability information and setting information from the MFPs 102 and 103 via the interface unit 501, and stores the acquired information.

[Arrangement of MFPs 102 and 103]

(Internal Arrangement (FIG. 5))

Figure 5:
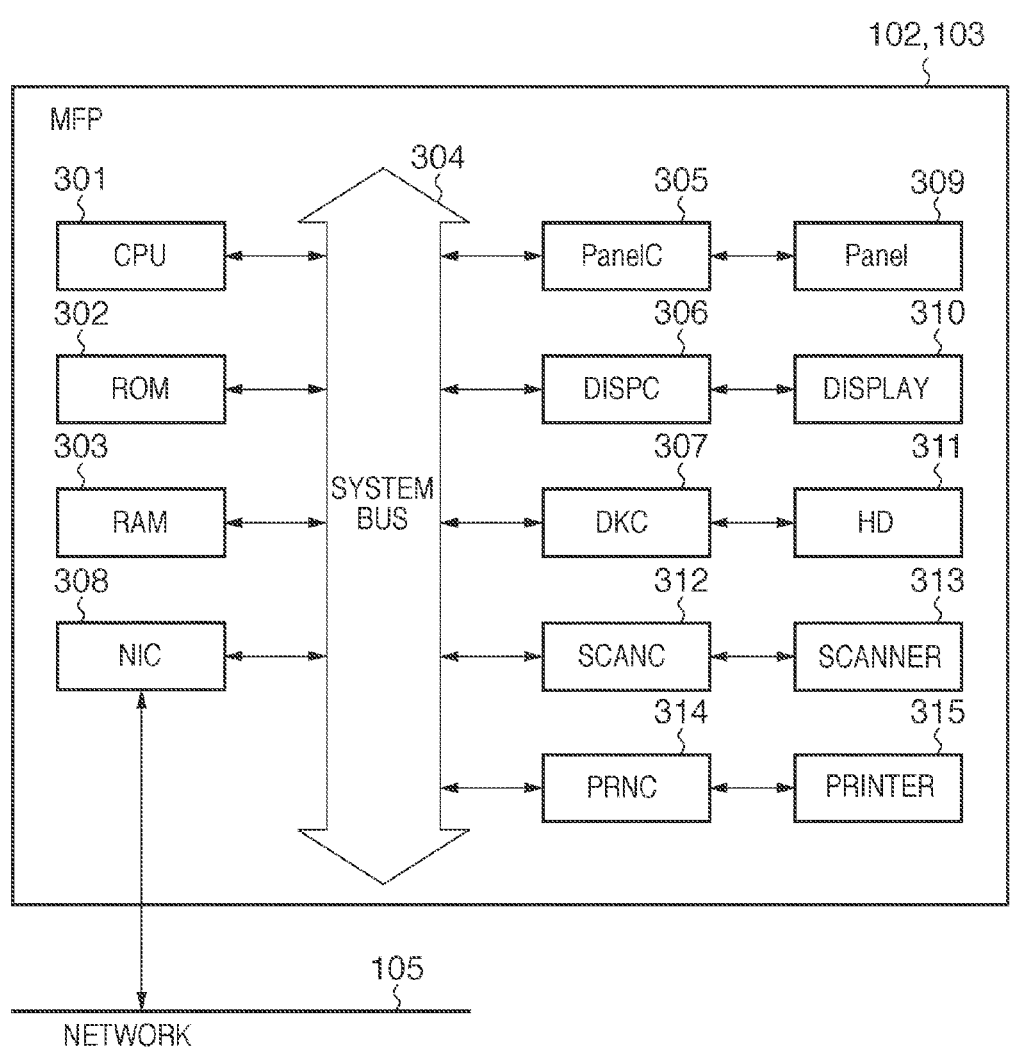
FIG. 5 is a block diagram showing the internal arrangement of an MFP.

Each of the MFPs 102 and 103 has the hardware arrangement shown in FIG. 5. A CPU 301 executes software stored in a ROM 302 or a hard disk 311 as a large-capacity storage device, and systematically controls respective devices connected to a system bus 304. A RAM 303 serves as, for example, a main memory and work area of the CPU 301. A panel controller (PanelC) 305 controls instruction inputs from an operation panel 309 equipped in each of the MFPs 102 and 103. A display controller (DISPC) 306 controls display processing of a display module (DISPLAY) 310, which includes, for example, a liquid crystal display. A disk controller (DKC) 307 controls the hard disk (HD) 311 as the large-capacity storage device. A network card interface (NIC) 308 exchanges data with another node via the network 105. A scanner controller (SCANC) 312 controls an optical scanner 313 equipped in each of the MFPs 102 and 103 to read a paper document. A printer controller (PRNC) 314 controls a printer 315 equipped in each of the MFPs 102 and 103, and prints an image on an actual sheet using a given print technique such as an electrophotography technique or ink-jet technique.

(Functional Arrangement (FIG. 6))

Figure 6:
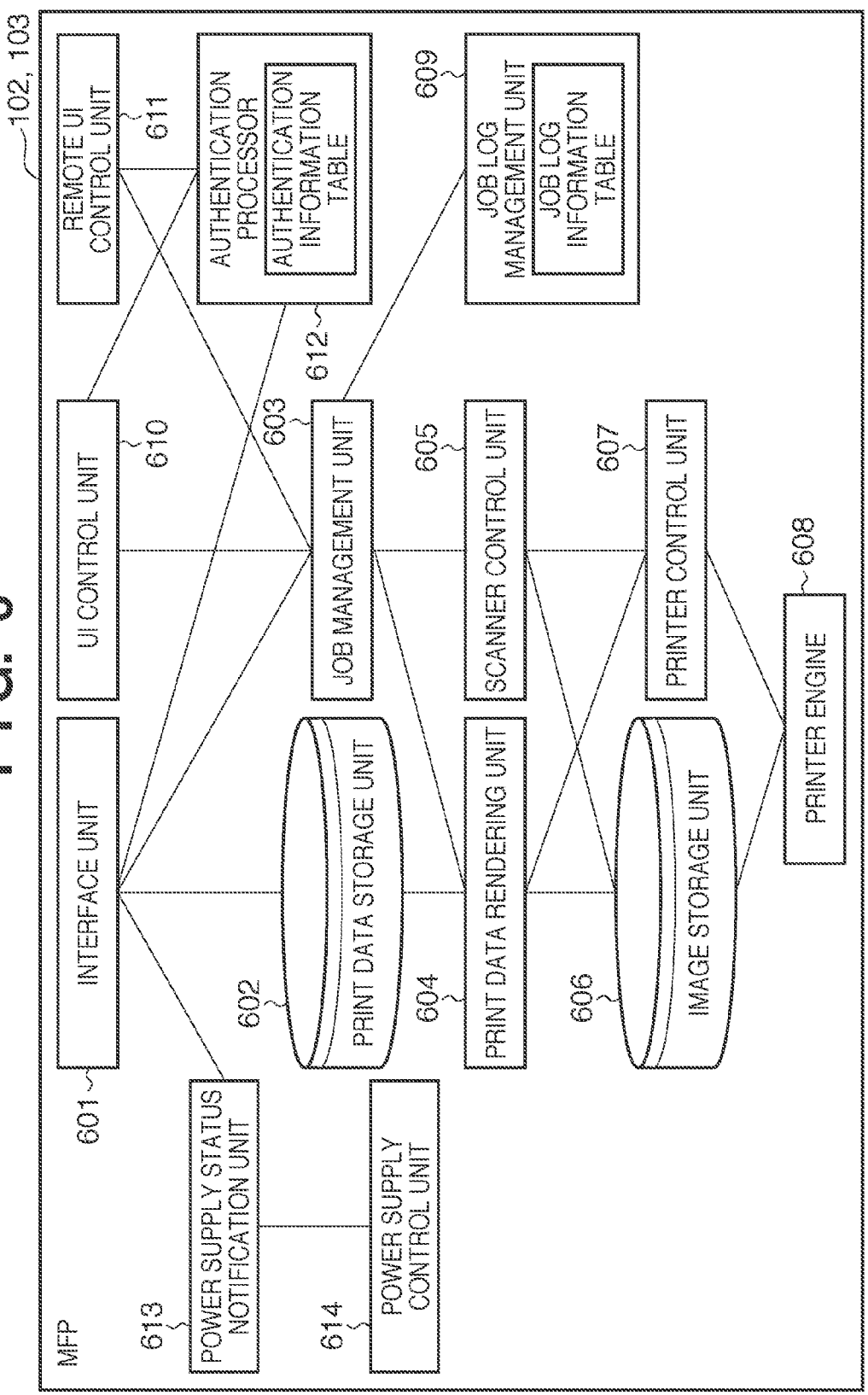
FIG. 6 is a block diagram showing the functional arrangement of the MFP.

Each of the MFPs 102 and 103 has the functional arrangement shown in FIG. 6. An interface unit 601 is connected to the network 105 to receive a print job from the host computer 101, and to notify the analysis server 104 of a power supply status. Also, the interface unit 601 (job log sending unit) sends a job log upon reception of a job log acquisition request from the analysis server 104. A print data storage unit 602 temporarily stores print job data in the RAM 303 or hard disk (HD) 311.

A UI control unit 610 controls the operation panel 309 via the panel controller (PanelC) 305 to receive a login request, copy instruction, and scan sending instruction of the user to each of the MFPs 102 and 103. Upon reception of a login request from the user, the UI control unit 610 sends authentication information such as a user name and password to an authentication processor 612 to issue an authentication request. When the authentication processing of the authentication processor 612 has succeeded, the UI control unit 610 receives an authentication ID. After that, the UI control unit 610 holds the user name and authentication ID until it receives a logout request. When the user operates to request to issue, for example, a copy job, the UI control unit 610 sends the user name and authentication ID to a job management unit 603 together with the job issuance request. When the user makes a logout operation from the operation panel, the UI control unit 610 executes logout processing. The UI control unit 610 has [time-out time period] as operation setting information. When the user does not make any operation on the operation panel during a time period set by [time-out time period], the UI control unit 610 executes the logout processing. The setting value of [time-out time period] is allowed to be referred to from an external module (for example, the analysis server). In the logout processing, the UI control unit 610 sends a logout notification to the authentication processor 612 together with the user name, authentication ID, and logout cause information, and discards the authentication information and authentication ID.

The job management unit 603 analyzes a print job to acquire a user name and output attribute information such as the number of copies to be printed and color settings, and manages the acquired information together with a job start time as job information. When the user issues a job (for example, a print job) from the operation panel, the job management unit 603 receives the output attribute information, user name, and so forth from the UI control unit 610. On the other hand, when the user issues a job from the Web browser, the job management unit 603 receives the output attribute information, user name, and so forth from a remote UI control unit 611.

A print data rendering unit 604 executes image generation processing by acquiring print data from the print data storage unit 602 in accordance with job information stored in the job management unit 603, thus generating image data. A scanner control unit 605 controls the scanner controller 312 to scan a paper document and to generate image data. An image storage unit 606 temporarily stores the image data generated by the print data rendering unit 604 and scanner control unit 605 in the RAM 303 and hard disk (HD) 311. A printer control unit 607 controls a printer engine 608 to print image data stored in the image storage unit 606. The printer engine 608 is a printer device which actually prints image data stored in the image storage unit 606 on a medium such as a print sheet using a given print technique such as an electrophotography technique or ink-jet technique.

A job log management unit 609 manages job log information. Upon completion of a job, the job management unit 603 sends the managed job information to the job log management unit 609 as job log information, which is then managed by the job log management unit 609. The job log management unit 609 sends the job log information to the analysis server 104 in response to a request from the analysis server 104.

The remote UI control unit 611 serves as an HTTP or HTTPS server, and receives a request from the Web browser 404 which runs on the host computer 101. Upon reception of the request from the Web browser 404, the remote UI control unit 611 acquires authentication information from session information, and inquires the authentication processor 612 as to whether or not an access is permitted. When the access is permitted, the remote UI control unit 611 sends requested HTML data to the Web browser 404; when the access is denied, the remote UI control unit 611 sends HTML data used to display a login form screen to the Web browser 404. Upon reception of input data to the login form from the Web browser 404, the remote UI control unit 611 issues an authentication request to the authentication processor 612. If the authentication has succeeded, the remote UI control unit 611 sends requested HTML data to the Web browser 404.

The authentication processor 612 executes authentication processing and management of each of the MFPs 102 and 103. The authentication processor 612 executes user authentication processing based on, for example, a login name and password which are input by the user in the login form on the operation panel 309 or Web browser 404. The authentication processor 612 receives an authentication request from the printer driver 402, and collates a user name and password. If the authentication has succeeded, the authentication processor 612 issues an authentication ID, and returns it together with an authentication success/failure message to the operation panel 309 or Web browser 404. The authentication processor 612 holds an authentication information table, and executes the user authentication processing by comparing an input user name and password with those registered in the table. Note that the user authentication processing may be implemented by making communications with an authentication server (not shown) and using an authentication information table held on the authentication server side.

A power supply control unit 614 controls the power supply of each of the MFPs 102 and 103 to manage three power supply statuses, that is, a normal mode, power saving mode (operation mode), and power OFF status. The power saving mode is a mode that requires a smaller power consumption amount than the normal mode. Note that the power supply control unit 614 may set the power saving mode to have a plurality of levels, or may set power saving modes for respective modules of each of the MFPs 102 and 103. The power supply control unit 614 can shift to respective power supply statuses according to various conditions. For example, when the user does not make any operation for a predetermined time period for each of the MFPs 102 and 103, and each of the MFPs 102 and 103 receives none of a print job, FAX data, and commands from the network in the normal mode, the power supply control unit 614 shifts the normal mode to the power saving mode. Also, when the user makes an arbitrary operation or each of the MFPs 102 and 103 receives a print job, FAX data, or commands from the network in the power saving mode, the power supply control unit 614 shifts the power saving mode to the normal mode. When the power supply control unit 614 changes the power supply status, it notifies a power supply status notification unit 613 of that change.

Upon reception of the notification from the power supply control unit 614, the power supply status notification unit 613 notifies the change in power supply status via the interface unit 601. The power supply status notification unit 613 periodically notifies the power supply status even during an operation in the normal mode. Upon notifying the power supply status, the power supply status notification unit 613 simultaneously notifies a remaining time period until the normal mode, which is not the power saving mode, shifts to the power saving mode. More specifically, the power supply status notification includes various types of notifications, that is, "active", "power saving shift", "power saving cancel", "power OFF", and "power ON".

An active notification indicates that the MFP is operating in the normal mode, and is periodically issued during the operation in the normal mode. A power saving shift notification is issued when the MFP shifts from the normal mode to the power saving mode. A power saving cancel notification is issued when the MFP shifts from the power saving mode to the normal mode. A power OFF notification is issued when the MFP shifts to a power OFF status. A power ON notification is issued when the power supply of the MFP is turned on from the power OFF status, and the MFP shifts to the normal mode. Note that the active and power saving cancel notifications also notify a remaining time period until the power supply status shifts to the power saving status (a time period until power saving mode shift) at the same time.

As a notification method via the interface unit 601, a unique or publicly defined protocol may be used. Also, the analysis server 104, which is designated in advance, may multicast or broadcast a notification to a plurality of partners.

[Various Tables]

(Example of Final Status Notification Table (FIG. 7A))

Figure 4:
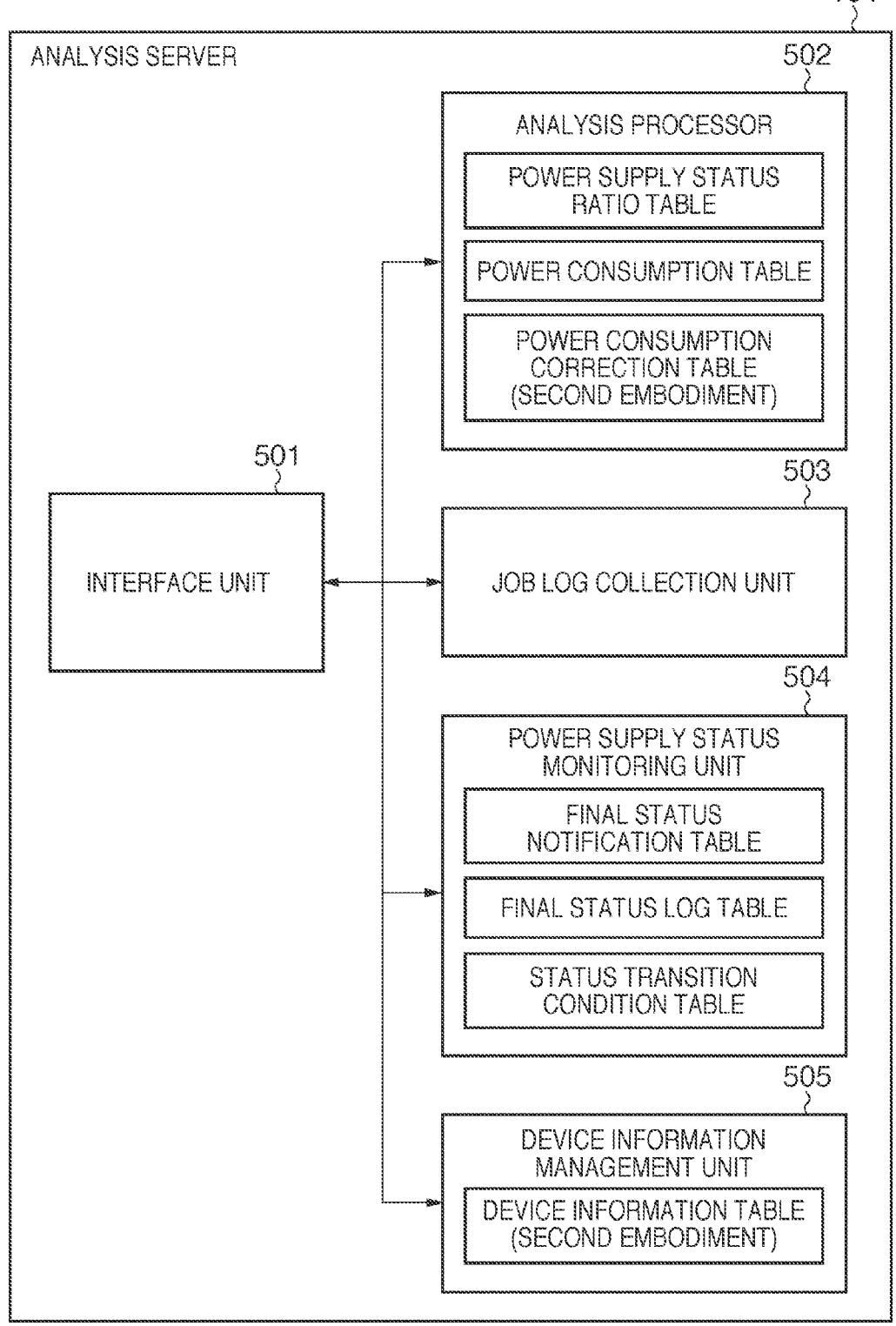
FIG. 4 is a block diagram showing the functional arrangement of an analysis server 104.

A final status notification table is held in the power supply status monitoring unit 504 of the analysis server 104 (see FIG. 4). The final status notification table is a table which records information indicating the final status of each MFP, and records a final power supply status notification or job log, which is received from the MFP and has a later time. An "MFP ID" column 1301 records identification information of an MFP. For example, a MAC address or IP address may be used. A "notification type" column 1302 indicates a type of a power supply status notification received from the MFP. More specifically, the types of power supply status notifications include "active", "power saving shift", "power saving cancel", "power OFF", "power ON", and "job execution". A "time" column 1303 sets a time of the analysis server 104 acquired upon reception of the power supply status notification or a job end time. A "time period until power saving mode shift" column 1304 sets a remaining time period (unit: seconds) until the power supply status shifts to the power saving mode (a time period until power saving mode shift), which is notified when the power supply status notification type is "active" or "power saving cancel".

(Example of Power Supply Status Log Table (FIG. 7B))

A power supply status log table (power supply status log recording unit) is held in the power supply status monitoring unit 504 (first memory) of the analysis server 104 (see FIG. 4). The power supply status log table is a table which records a status of each MFP calculated from the power supply status notification and job log. An "MFP ID" column 1401 records identification information of an MFP. For example, a MAC address or IP address may be used. A "time" column 1402 records a time at which the status of the MFP may have been changed based on the calculation result. A "status" column 1403 records a status that may be set after transition of the MFP based on the calculation result.

(Example of Status Transition Condition Table (FIG. 8A))

A status transition condition table is held in the power supply status monitoring unit 504 of the analysis server 104 (see FIG. 4). The status transition condition table is a table which records statuses before power supply status notifications and those after power supply status notifications for respective types of power supply status notifications (power supply events). A "notification type" column 1201 indicates a type of power supply status notification. More specifically, the types of power supply status notifications include "active", "power saving shift", "power saving cancel", "power OFF", "power ON", and "job execution". A "pre-status condition" column 1202 indicates a status in which the MFP should be set before a notification of a type indicated by the notification type 1201 when that notification is received. A "post-status" column 1203 indicates a status in which the MFP is to be set after a notification of a type indicated by the notification type 1201 when that notification is received. For example, a record 1211 indicates properties about a power supply status notification having the notification type 1201= [power ON]. The pre-status condition 1202 of the record 1211 is [power OFF], and this indicates that when [power ON] is notified, the MFP should be set in a [power OFF] status before that notification. The post-status 1203 of the record 1211 is [normal mode], and indicates that after [power ON] is notified, the MFP shifts to a [normal mode] status. Note that an attribute 1204 is used in the second embodiment, and may be omitted in the first embodiment.

(Example of Job Log Information Table (FIG. 8B))

A job log information table (job log recording unit) is held in the job log management unit 609 (second memory) of the MFP (see FIG. 6). A "job log ID" column 701 records an ID which uniquely identifies a job log in the system. An "MFP ID" column 702 records an ID which identifies an MFP. For example, a MAC address or IP address may be used. A "job type" column 703 indicates job types including, for example, print, copy, and scan jobs as print jobs from the host computer 101, and a box print job that requests to print documents saved in each MFP. A "number of color print pages" column 706 records the number of pages printed by a job of interest. A "number of monochrome print pages" column 707 records the number of pages printed by a job of interest. A "number of scan pages" column 708 records the number of pages scanned by a job of interest. The number of scan pages 708 can distinctly record, for example, the number of color scan pages and the number of monochrome scan pages. With these pieces of information, job log information including an MFP, a type of job, and start and end times of the job is recorded. For example, a job log 711 indicates that MFP A executed a copy job which was started at 2009/09/25__14:25:30 and was ended at 2009/09/25__14:40:30. Furthermore, the job log 711 also indicates that 10 pages were scanned, and 10 pages were color-printed in this job. The job log information table may be created for each job type.

(Example of Power Supply Status Ratio Table (FIG. 9A))

A power supply status ratio table is held in the analysis processor 502 (power supply status accumulated time period calculation unit) of the analysis server 104 (see FIG. 4). Respective columns 12a to 11p represent one-hour time zones in one day, and rows 1601 to 1604 indicate power supply status types, so that this table represents accumulated time periods of the respective power supply statuses in respective time zones. For example, the column 9a indicates a time zone from 9:00 am to 10:00 am, and indicates that this time zone includes 10% of job processing, 55% of the normal mode, 30% of the power saving mode, and 5% of the power OFF status. Note that a table which records occupation ratios of the respective power supply statuses in respective time zones may be used in place of the power supply status ratio table. The power supply status ratio table is updated by the analysis processor 502 periodically (for example, daily or monthly). Note that an attribute 1605 is used in the second embodiment, and may be omitted in the first embodiment.

(Example of Power Consumption Table (FIG. 9B))

Figure 13B:
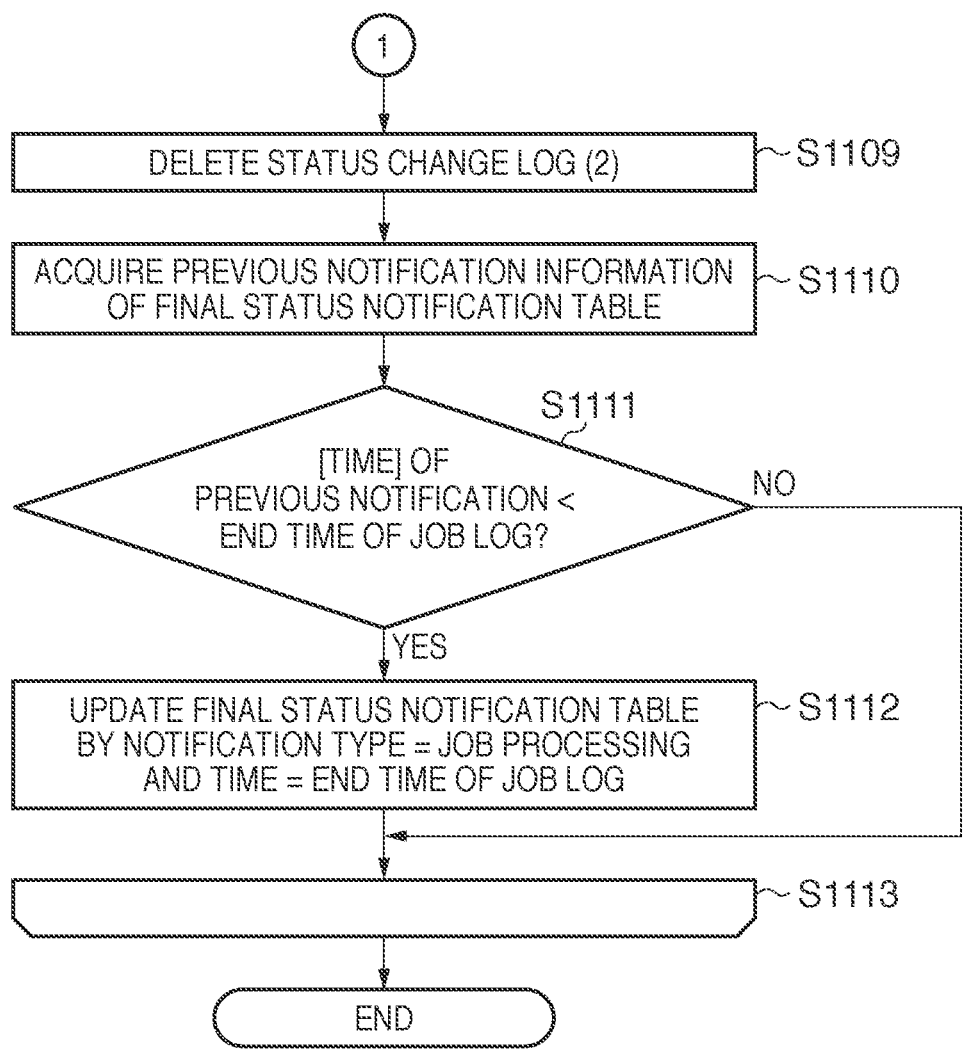

A power consumption table is held in the analysis processor 502 of the analysis server 104 (see FIG. 4). A column 1501 indicates an MFP ID, that is, identification information of an MFP, and indicates about which MFP a row of interest includes setting values. A column 1502 indicates a power consumption in the normal mode. A column 1503 indicates a power consumption in the power saving mode. A column 1504 indicates a power consumption during job processing. A column 1505 indicates a power consumption in the power OFF status. For example, a row 1511 includes settings about an MFP identified by [MFP A], and indicates that MFP A consumes an electrical power of 100 W in the normal mode, that of 1 W in the power saving mode, that of 1000 W during job processing, and that of 0 W in the power OFF status. Also, as for MFP D indicated by a row 1514, no value is set in the power saving mode column 1503 and power OFF column 1505. When MFP D does not have any power supply status notification function, or when no power supply status notification reaches the analysis server 104 due to its network configuration, power consumption values are not set. Since such MFP is adjusted to be set in the normal mode other than time periods of job processing by processing in step S1106 in FIG. 13A, power consumption values during job processing and in the normal mode need only be set. As the setting values of the power consumption table, initial values may be decided depending on models of MFPs. A model name of the MFP may be acquired by the device information management unit 505 from that MFP via a network using, for example, an SNMP protocol. Alternatively, the user can designate or change setting values using an input device of the analysis server 104.

[Processing Sequence of Power Supply Status Monitoring Unit 504]

Figure 10:
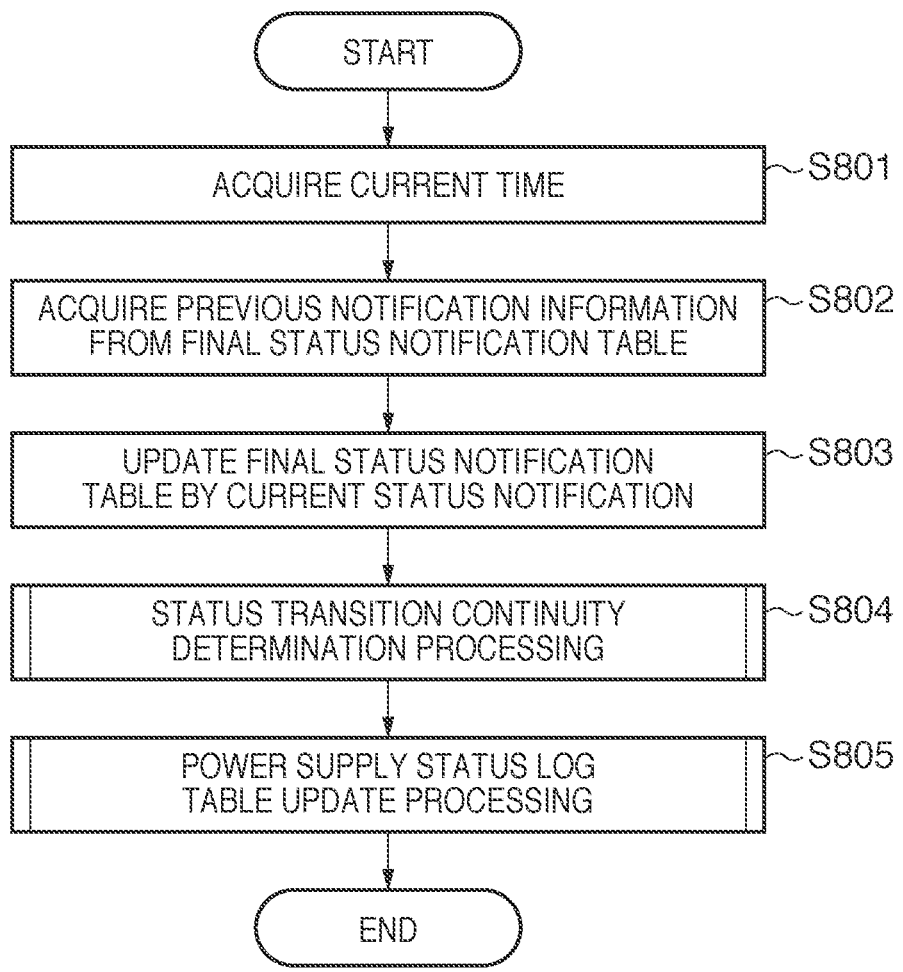
FIG. 10 is a flowchart showing the overall processing sequence of a power supply status monitoring unit 504.

(Overall Processing Sequence (FIG. 10))

Upon reception of a power supply status notification from each of the MFPs 102 and 103, the power supply status monitoring unit 504 of the analysis server 104 starts the following processing. Initially, the power supply status monitoring unit 504 acquires the current time of the analysis server 104 (S801). The power supply status monitoring unit 504 acquires previous power supply status notification information of the MFP, which issued the current power supply status notification, based on the final status notification table (see FIG. 7A) (S802). In order to identify the MFP which issued the current power supply status notification, for example, an IP address or MAC address of a notification source of the power supply status notification is used. The power supply status monitoring unit 504 updates the final status notification table by the current power supply status notification information (S803). In the update processing in step S803, the MFP ID 1301 is acquired based on the notification source information of the power supply status notification, and a row that matches the MFP ID 1301 is updated. The power supply status monitoring unit 504 executes status transition continuity determination processing (S804), and then executes power supply status log table update processing (S805), thus ending this processing.

Figure 11:
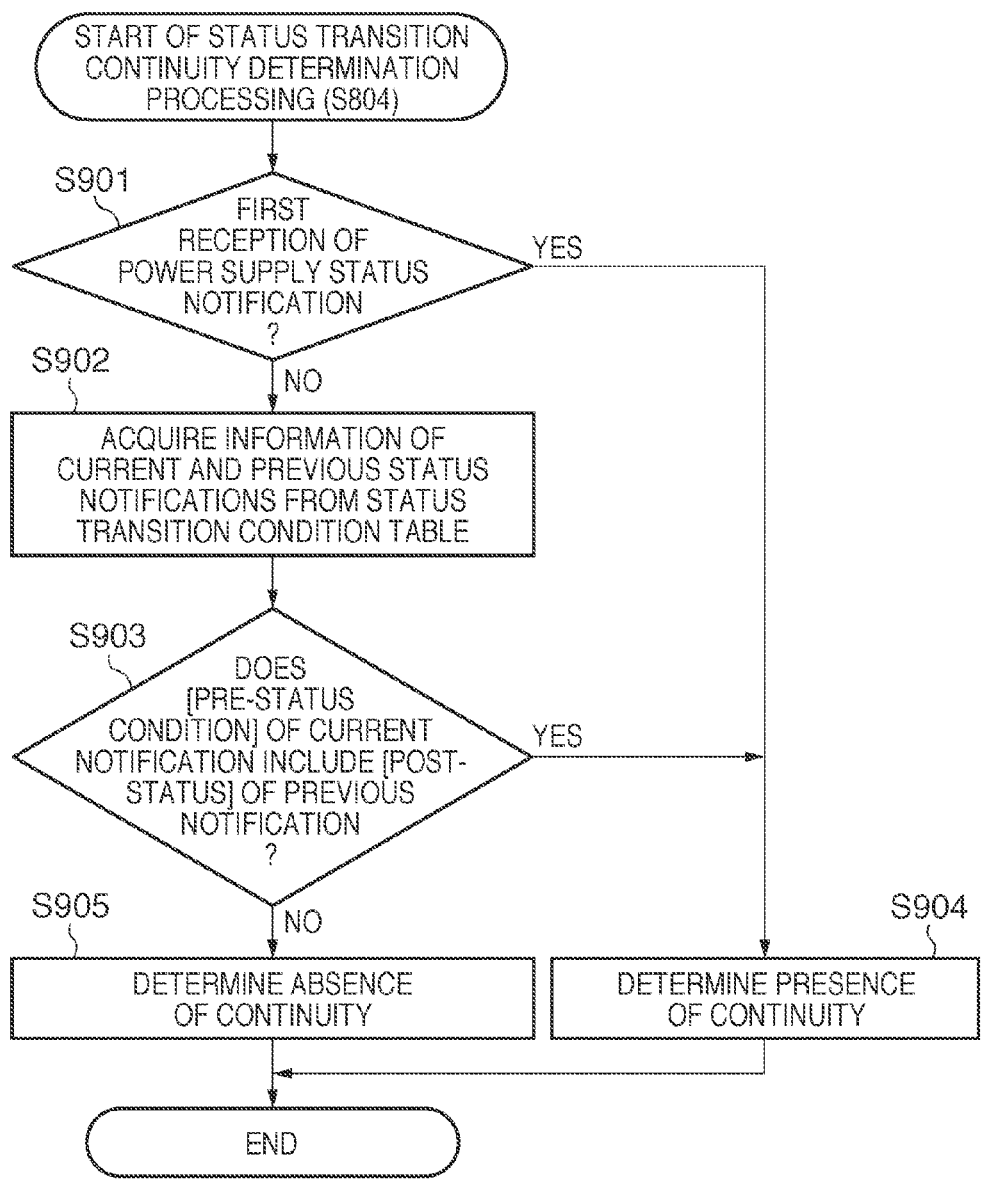
FIG. 11 is a flowchart showing the detailed processing sequence of status transition continuity determination processing (S804)

(Detailed Processing Sequence (FIG. 11) of Status Transition Continuity Determination Processing (S804))

When this processing starts, the power supply status monitoring unit 504 determines whether or not the power supply status notification is received for the first time (S901). For example, if the final status notification table (see FIG. 7A) does not include any previous power supply status notification information of the MFP which issued the current power supply status notification in step S802, and the power supply status monitoring unit 504 stores that fact, the power supply status monitoring unit 504 can judge the first reception based on that fact. If the power supply status notification is received for the first time, the power supply status monitoring unit 504 determines the presence of continuity (S904), and ends the processing in step S804. On the other hand, if the power supply status notification is received not for the first time, the power supply status monitoring unit 504 acquires pieces of information of the current and previous power supply status notifications from the status transition condition table (see FIG. 8A) (S902). Then, the power supply status monitoring unit 504 determines whether or not [pre-status condition] corresponding to the current power supply status notification includes [post-status] corresponding to the previous power supply status notification (S903). For example, when the notification type of the current power supply status notification is [power OFF] and that of the previous power supply status notification is [power ON], since the pre-status condition in case of [power OFF] is [normal mode, power saving mode], and the post-status condition in case of [power ON] is [normal mode], these conditions are satisfied. If the conditions are satisfied, the power supply status monitoring unit 504 determines the presence of continuity (S904), thus ending the processing in step S804. On the other hand, if the conditions are not satisfied, the power supply status monitoring unit 504 determines the absence of continuity due to status incoherence (S905), thus ending the processing in step S804.

Figure 12:
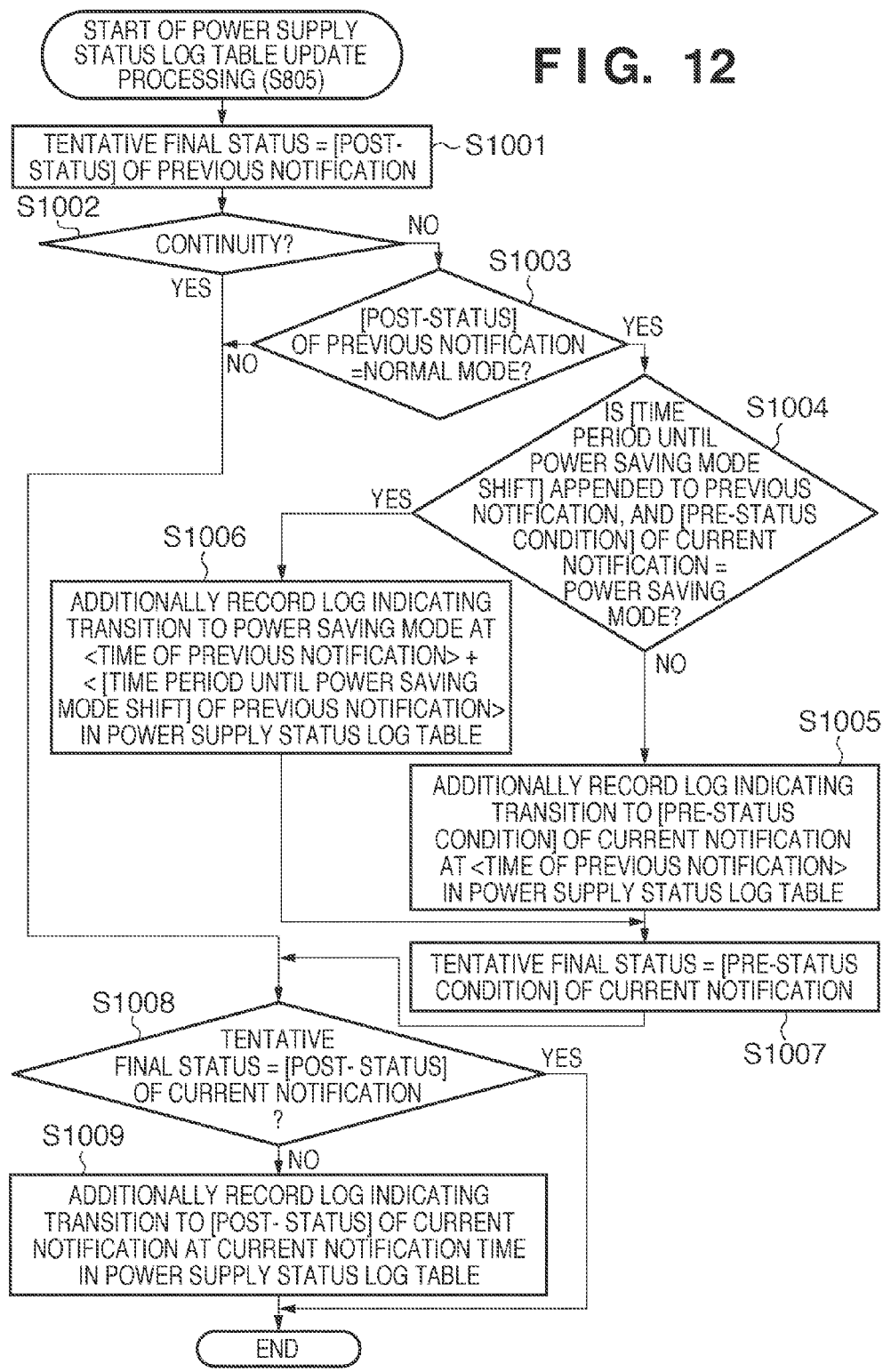
FIG. 12 is a flowchart showing the detailed processing sequence of power supply status log table update processing (S805)

(Detailed Processing Sequence (FIG. 12) of Power Supply Status Log Table Update Processing (S805))

When this processing starts, the power supply status monitoring unit 504 initializes a variable (tentative final status) by [post-status] of the previous power supply status notification (S1001). The power supply status monitoring unit 504 then checks the presence/absence of continuity based on the result of the above status transition continuity determination processing (S1002). If the presence of continuity is determined, the process advances to step S1008. On the other hand, if the absence of continuity is determined, the power supply status monitoring unit 504 determines whether or not [post-status] of the previous notification is a normal mode (S1003). If [post-status] is not the normal mode, the process advances to step S1008. On the other hand, if [post-status] is the normal mode, the power supply status monitoring unit 504 determines whether or not [time period until power saving mode shift] information is appended to the previous power supply status notification, and [pre-status condition] of the current power supply status notification is [power saving mode] (S1004). If the conditions are not satisfied, the power supply status monitoring unit 504 additionally records a log indicating transition to the pre-status condition of the current notification at the previous notification time in the power supply status log table (see FIG. 7B) (S1005). In this case, the log to be additionally recorded includes, for example, the MFP ID (that of the notification source), time (previous power supply status notification time), and status (the pre-status condition of the current power supply status notification). On the other hand, if the conditions are satisfied, the power supply status monitoring unit 504 additionally records a log indicating transition to the power saving mode at a time obtained by adding the time period until power saving mode shift in the previous notification to the previous notification time in the power supply status log table (S1006). In this case, the log to be additionally recorded includes, for example, the MFP ID (that of the notification source), time ([time] of the previous power supply status notification+[time period until power saving mode shift]), and status (the pre-status condition of the current power supply status notification). The power supply status monitoring unit 504 then sets [pre-status condition] of the current notification in the variable (tentative final status) (S1007). The power supply status monitoring unit 504 determines whether or not the value of the variable (tentative final status) is equal to [post-status] of the current power supply status notification (S1008). If the two values are not equal to each other, the power supply status monitoring unit 504 additionally records a log indicating transition to the post-status of the current notification at the current notification time in the power supply status log table (S1009). In this case, the log to be additionally recorded includes, for example, the MFP ID (that of the notification source), time (current notification time), and status ([post-status] of the current notification). On the other hand, if the two values are equal to each other, the processing in step S805 ends.

[Job Log Collection Processing]

The job log collection unit 503 of the analysis server 104 communicates with each of the MFPs 102 and 103 via the interface unit 501 to collect job logs managed by the job log management unit 609. The acquired job logs are saved in the job log collection unit 503 as a table having a format equivalent to the job log information table shown in FIG. 8B or that obtained by expanding the table. When pieces of job log information are collected from a plurality of MFPs, a column of MFP identifiers may be added.

[Status Transition Correction Processing Using Job Log (FIGS. 13A and 13B)]

When the job log collection unit 503 receives a notification from the MFP at the end timing of the job log collection processing, the analysis processor 502 of the analysis server 104 executes status transition correction processing for the collected job logs. In this correction processing, the power supply status log table (see FIG. 7B) is updated based on the job log so that the power supply status transits to [job processing] at a job start time and restores to a previous status at a job end time. When power supply status notifications are normally received, a power supply status from a job start time until a job end time should be [normal mode]. However, when power supply status notifications are not normally received, [status] may be [power OFF] or [power saving mode]. In this case, the update processing is executed so that [status] of the power supply status log immediately before a job end time is also restored at the job end time. Since jobs may be successively executed, the table is updated so that [job processing] is continued in such case.

When the status transition correction processing using job logs starts, the analysis processor 502 repeats processes in steps S1101 to S1113 for job logs to be processed in their start time order. In step S1102, the analysis processor 502 searches the power supply status log table for status change logs in which values of the time column 1402 satisfy the following three conditions of power supply status logs whose MFP ID 1401 matches the MFP ID 702 in job logs, so as to acquire such logs. As the three conditions, the value of the time column 1402 corresponds to one of (1) a time period immediately before a start time 704 of a job log, (2) a time period from the start time 704 until an end time 705 of a job log, and (3) a time period immediately before the end time 705 of a job log. Note that "immediately before" a certain time indicates a value which is before that time and is closest to that time of the values of the time column in entries of the power supply status log table.

If power supply status log does not exist in a time period (2) from the start time of the job log to the end time of the job log, power supply status logs in time periods (1) and (3) include the same contents. If power supply status log does not exist in all time periods (1) to (3), power supply status log does not exist in all time periods (1) to (3).

Then, the analysis processor 502 determines whether or not a status log in time periods (1) (immediately before the job start time) exists and its [status] is equal to [job processing] (S1103). If [status] is equal to [job processing], the process jumps to step S1105. If [status] is not equal to [job processing], the analysis processor 502 additionally records a log indicating transition to [job processing] at the start time of the job log in the power supply status log table (S1104). In this case, the log to be additionally recorded includes, for example, the MFP ID (that of the job log), time (the start time of the job log), and status (job processing).

The analysis processor 502 determines whether a power supply status log of a status log in time period (3) (immediately before the job end time) exists (S1105). power supply status log of a status log in time period (3) (immediately before the job end time) does not exist when a job was processed before the power supply status notification was received and when no power supply status notification is received from the MFP. No power supply status notification is received from the MFP when the MFP does not have any power supply status notification function, and a power supply status notification does not reach the analysis server 104 due to, for example, the network configuration.

If it is determined in step S1105 that such power supply status log does not exist, the analysis processor 502 additionally records a log indicating transition to the normal mode at the end time of the job log in the power supply status log table (S1106). In this case, the information to be additionally recorded includes, for example, the MFP ID (that of the job log), time (the end time of the job log), and status (normal mode). With this processing, when no power supply status notification is received from the MFP, a power supply status log is adjusted to set the normal mode in a time period other than that of job processing.

On the other hand, if it is determined in step S1105 that such power supply status log exists, the analysis processor 502 determines whether or not [status] of a status log in time period (3) (immediately after the job end time) is equal to [job processing] (S1107). If [status] is equal to [job processing], the process jumps to step S1109. On the other hand, if [status] is not equal to [job processing], the analysis processor 502 additionally records a log indicating transition to a status of the status log (3) at the end time of the job log in the power supply status log table (S1108). In this case, the information to be additionally recorded includes the MFP ID (that of the job log), time (the end time of the job log), and status ([status] of the status log (3) (immediately before the job end time)).

The analysis processor 502 deletes status change logs (2) (from the job start time until the end time) from the power supply status log table (S1109). Then, the analysis processor 502 acquires the previous notification information of the final status notification table (S1110). The analysis processor 502 determines whether or not [time] of the previous notification is before the end time of the job log (S1111). If [time] is not before the end time, the process jumps to step S1113. On the other hand, if [time] is before the end time, the analysis processor 502 updates a row in the final status notification table whose MFP ID 1301 matches the MFP ID of the job log to include a notification type (job processing) and time (the end time of the job log) (S1112). If the end condition of the loop processing is satisfied (S1113), this processing ends.

[Processing Sequence of Power Supply Status Ratio Table Update Processing (FIG. 14)]

The power supply status ratio table update processing by the analysis processor 502 is that which is executed when only one MFP is connected. When a plurality of MFPs are connected, the processing is repeated for respective MFPs. In this case, power supply status ratio tables are prepared for respective MFPs to save calculation results.

When this processing starts, the analysis processor 502 acquires power supply status logs of an MFP which has not been processed yet of those to be processed (S1901). The analysis processor 502 initializes a variable (pre-status log) to NULL (no value) (S1902). In the variable (pre-status log), a power supply status log can be set. In the variable (pre-status log), a power supply status log to be processed at the time of the previous loop of the loop processing repeated from step S1903 to step S1907 is set.

Subsequently, the analysis processor 502 repetitively processes the processes in steps S1903 to S1907 for the power supply status logs to be processed acquired in step S1901 in the chronological order of the power supply status logs. In step S1903, the analysis processor 502 selects an entry of interest from those of the power supply status log to be processed in turn from the first entry. Then, the analysis processor 502 determines whether or not the variable (pre-status log) is NULL (S1904). If the variable is NULL, the process jumps to step S1906. On the other hand, if the variable is not NULL, the analysis processor 502 adds a row whose [status] column in the power supply status ratio table is equal to [status] of the variable (pre-status log) to a column corresponding to a time period between [time] of the variable (pre-status log) and that of the power supply status log of interest to be processed in the current loop processing (S1905). For example, when [time] of the variable (pre-status log) is 8:15 am, and that of the power supply status log of interest is 8:30 am, the analysis processor 502 adds 25% (ratio) or 15 min (time period) to a column of a status corresponding to this time zone. Then, the analysis processor 502 sets [status] of the power supply status log to be processed in the variable (pre-status log) (S1906).

Then, the analysis processor 502 updates the processed power supply status log ID of the MFP to be processed (S1908). The next update processing starts from a log next to the currently processed power supply status log. Subsequently, the analysis processor 502 determines whether or not the variable (pre-status log) is NULL (S1909). If the variable is NULL, a series of processes end. On the other hand, if the variable is not NULL, the analysis processor 502 adds a row whose [status] column of the power supply status ratio table is equal to [status] of the variable (pre-status log) to a column corresponding to a time period between [time] of the variable (pre-status log) and the current time (S1910). Then, the analysis processor 502 additionally records a log indicating transition of the MFP to be processed to [status] of the variable (pre-status log) at the current time in the power supply status log table (S1911), thus ending a series of processes. In this case, the information to be additionally recorded includes, for example, the MFP ID (that to be processed), time (the current time), and status (variable [status]).

Figure 15A:
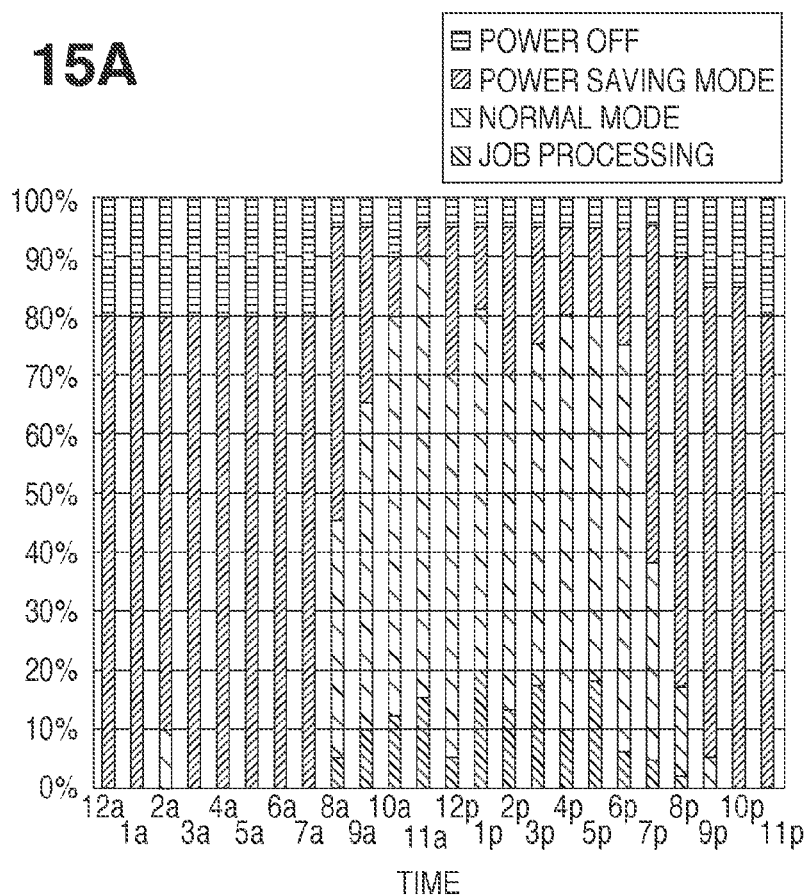
FIG. 15A shows an example of a power supply status ratio graph.

A power supply status ratio graph shown in FIG. 15A is obtained by converting accumulated time periods of respective statuses in respective time zones of the power supply status ratio table into ratios, and generating a graph based on the these ratios, and is displayed on a display of the analysis server 104. Note that data of the power supply status ratio table of one MFP may be converted into a graph, or average values of the values of the power supply status ratio tables of the plurality of MFPs may be calculated, and may be converted into a graph.

[Power Consumption Analysis Processing (FIG. 15B)]

Figure 15B:
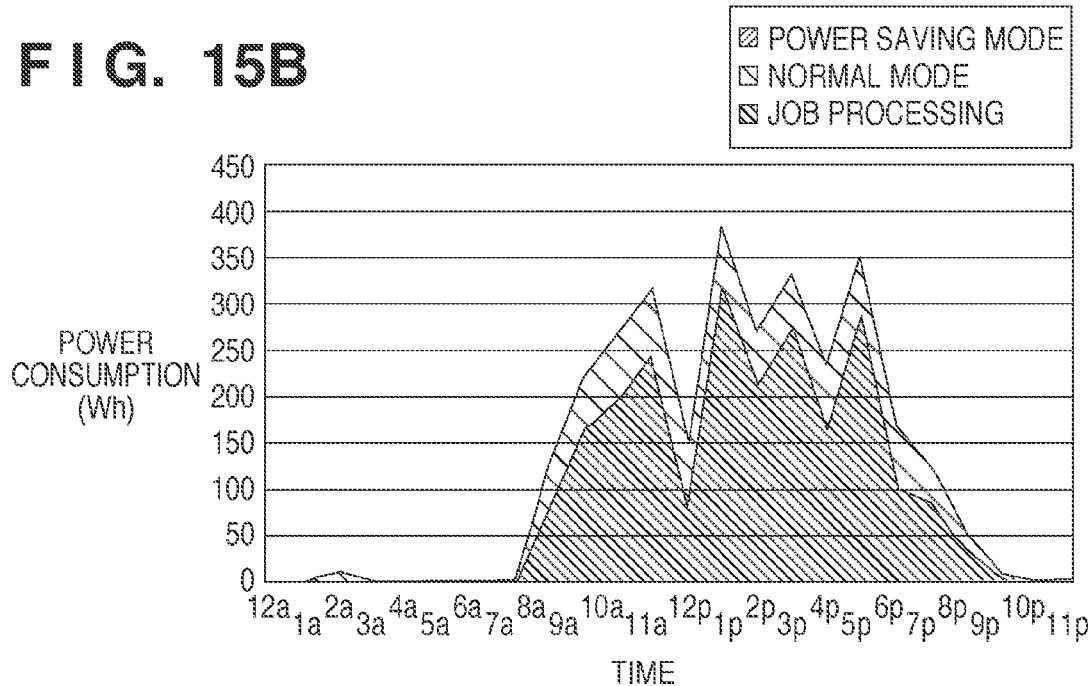
FIG. 15B shows an example of a power consumption analysis result graph.

The analysis processor 502 acquires power consumptions in statuses of the MFP of interest from the power consumption table (see FIG. 9B) for respective power supply statuses in association with respective statuses in the power supply status ratio table. Then, the analysis processor 502 (power consumption amount calculation unit) calculates power consumption amounts for respective statuses in respective time zones by multiplying the acquired power consumptions for respective statuses and accumulated time periods. FIG. 15B is a graph which displays power consumption amounts corresponding to respective power supply statuses in correspondence with respective time zones. This power consumption analysis result graph is displayed on the display (power consumption amount display unit) of the analysis server 104. Note that data of the power supply status ratio table of one MFP may be converted into a graph, or power consumption amounts may be calculated using accumulated time periods of the power supply status ratio tables of the plurality of MFPs and may be converted into a graph.

As described above, according to this embodiment, power consumption amounts that reflect use states can be calculated from the power supply status notifications and job log information from the MFPs 102 and 103 without polling the MFPs 102 and 103 from the analysis server 104 to confirm statuses and to record status transition times.

<Second Embodiment>

The second embodiment improves the first embodiment, and improves the power consumption calculation precision during job processing by checking a job type, the number of job processing pages of each MFP (for example, the number of printed pages and the number of scanned pages), and a job processing speed (for example, a print speed and scan speed) in a job log. Furthermore, the second embodiment improves the precision of power supply status correction processing using power saving mode shift time-out setting information of each MFP. Differences from the first embodiment will be described below.

[Various Tables]

A final status notification table (see FIG. 7A) and job log information table (see FIG. 8A) are the same as those of the first embodiment, and a description thereof will not be repeated.

(Example of Status Transition Condition Table (FIG. 8A))

In a status transition condition table according to the second embodiment, a "normal mode duration" attribute 1204 which represents how long a status of a pre-status condition 1202 indicated by a notification lasted before the notification is additionally recorded. For example, when a notification type of a row 1213 indicates "power saving shift", the attribute indicates to allow to judge that the normal mode lasted for a <power saving mode shift time-out> time period before the notification time.

(Example of Power Supply Status Log Table (FIG. 16A))

A power supply status log table according to the second embodiment is obtained by expanding the power supply status log table of the first embodiment (see FIG. 7B). That is, the power supply status log table of the first embodiment is expanded to record the numbers of pages of print and scan processes executed by jobs in a [job processing] status. An "MFP ID" column 2301 is the same as the column 1401. A "time" column 2302 is the same as the column 1402. A "status" column 2303 is the same as the column 1403. A "color print" column 2304 indicates the number of pages of color print processing executed by a job in a [job processing] status. After a status change of a row of interest, a "monochrome print" column 2305 indicates the number of pages of monochrome print processing executed by a job in a [job processing] status. A "scan" column 2306 indicates the number of pages of scan processing executed by a job in a [job processing] status. The columns 2304, 2305, and 2306 are set when the status 2303 of a row of interest is [job processing], and indicate the numbers of pages of the print and scan processes executed until the next status log.

(Example of Device Information Table (FIG. 16B))

A device information table is held in the device information management unit 505 of the analysis server 104 (see FIG. 4). The device information table stores various kinds of setting information and capability information of MFPs. An "MFP ID" column 2201 records identification information of an MFP, and indicates about which MFP a row of interest includes setting values. An attribute 2202 indicates whether or not an MFP has a power supply status notification function. An attribute 2203 indicates a [power saving mode shift timeout] setting value of an MFP. When neither an operation nor job execution is made during the [power saving mode shift time-out] time period in a normal mode status, an MFP shifts to a power saving mode. An attribute 2204 includes a monochrome print speed (pages/min), and indicates the print speed of monochrome pages by an MFP. A "color print speed" attribute 2205 indicates a print speed (pages/min) of color pages by an MFP. For example, a row 2211 includes information of MFP A, and indicates that MFP A has a power supply status notification function, a [power saving mode shift time-out] setting value is "6000 sec", the monochrome print speed is "30 pages/min", and the color print speed is "25 pages/min". The device information management unit 505 acquires these pieces of information from the MFP via a network using, for example, an SNMP protocol.

(Example of Power Supply Status Ratio Table (FIG. 9A))

In a power supply status ratio table according to the second embodiment, a "power consumption correction amount" attribute 1605 used to correct a power consumption amount based on the numbers of printed pages and the number of scanned pages during job processing is additionally recorded.

(Example of Power Consumption Table (FIG. 17A))

A power consumption table according to the second embodiment is obtained by expanding the power consumption table for respective power supply statuses of the first embodiment (see FIG. 9B). A column 2001 records an MFP ID, and is the same as the column 1501. A column 2002 indicates a power consumption in a normal mode as in the column 1502. A column 2003 indicates a power consumption in a power saving mode as in the column 1503. A column 2004 indicates a power consumption during print job processing. The power consumption of, for example, a copy job is recorded in this column. A column 2005 indicates a power consumption during print-less job processing. For example, the power consumption of a scan job is recorded in this column. A column 2006 indicates a power consumption in a power OFF status as in the column 1505.

(Example of Power Consumption Correction Table (FIG. 17B))

A power consumption correction table is held in the analysis processor 502 of the analysis server 104 (see FIG. 4). The power consumption correction table stores power consumptions at the time of print and scan processes of respective MFPs. These power consumptions are power consumption amounts used in power consumption amount correction processing. An "MFP ID" column 2101 records identification information of an MFP, and indicates about which MFP a row of interest includes setting values. A column 2102 indicates a power consumption correction amount required to print the first page. A column 2103 indicates a power consumption correction amount per page required to execute color print processing. A column 2104 indicates a power consumption correction amount per page required to execute monochrome print processing. A column 2105 indicates a power consumption correction amount per page required to execute scan processing.

[Processing Sequence of Power Supply Status Monitoring Unit 504]

Since the overall processing sequence is the same as that of the first embodiment (FIG. 10), a description thereof will not be repeated.

(Detailed Processing Sequence (FIG. 18) of Status Transition Continuity Determination Processing (S804))

As status transition continuity determination processing according to the second embodiment, that of the first embodiment (FIG. 11) is expanded. When the status transition continuity determination processing starts, the power supply status monitoring unit 504 determines whether or not a power supply status notification is received for the first time (S2401). This step is the same as step S901. If the power supply status notification is received for the first time, the power supply status monitoring unit 504 determines the presence of continuity (S2404), and ends a series of processes. If the power supply status notification is received not for the first time, the power supply status monitoring unit 504 acquires pieces of information of the current and previous status notifications from the status transition condition table (see FIG. 8A) (S2402) as in step S902. Then, the power supply status monitoring unit 504 determines whether or not [pre-status condition] of the current power supply status notification includes [post-status] of the previous power supply status notification (S2403) as in step S903. If [pre-status condition] does not include [post-status], the power supply status monitoring unit 504 determines the absence of continuity (S2405), thus ending a series of processes. On the other hand, if [pre-status condition] includes [post-status], the power supply status monitoring unit 504 determines whether or not [post-status] of the previous notification is a normal mode (S2406). If [post-status] is not a normal mode, the power supply status monitoring unit 504 determines the presence of continuity (S2404), thus ending a series of processes. On the other hand, if [post-status] is a normal mode, the power supply status monitoring unit 504 determines whether or not a target MFP is set to shift to a power saving mode (S2407). In this checking process, the power supply status monitoring unit 504 acquires the "power saving mode shift time-out" setting value 2203 of the MFP of interest in the device information table (see FIG. 16B) from the device information management unit 505. Alternatively, when [time period until power saving mode shift] of the power supply status notification assumes a specific value, it may notify that the MFP is set not to shift to the power saving mode.

The power supply status monitoring unit 504 calculates how long the normal mode was presumed to last after the previous notification (S2408) using:

[Presumed normal mode duration time of previous notification]=<time of previous notification>+< [time period until power saving mode shift] of previous notification>

Subsequently, the power supply status monitoring unit 504 calculates how long the normal mode was presumed to last before the current notification (S2409) using:

[Presumed normal mode start time of current notification]=<time of current notification>−<normal mode duration>

When the process reaches step S2409 as a result of the checking results in steps S2403 and S2406, the pre-status condition of the current notification includes a normal mode. Then, the power supply status monitoring unit 504 determines whether or not [presumed normal mode duration time after previous notification] is equal to or later than [normal mode start time before current notification] (S2410). If [presumed normal mode duration time after previous notification] is equal to or later than [normal mode start time before current notification], since it can be determined based on the statuses and conditions of the current and previous notifications that the normal mode lasted during this period, the power supply status monitoring unit 504 determines the presence of continuity (S2404). Otherwise, since the presumed normal mode duration time deviates, the power supply status monitoring unit 504 determines the absence of continuity (S2405).

Figure 19B:
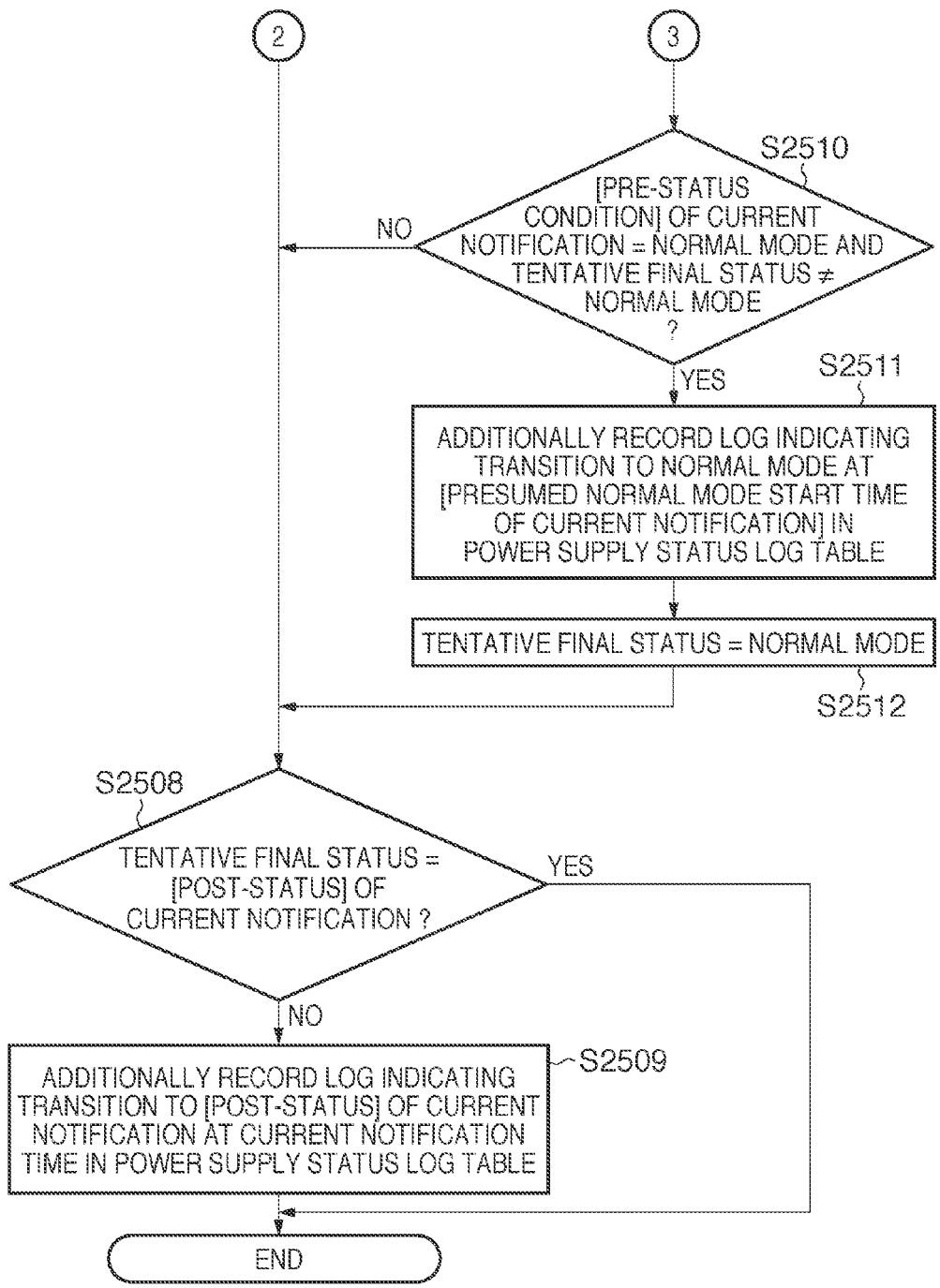

(Detailed Processing Sequence (FIGS. 19A and 19B) of Power Supply Status Log Table Update Processing (S805))

As power supply status log table update processing according to the second embodiment, that of the first embodiment (see FIG. 12) is expanded. When the power supply status log table update processing starts, the power supply status monitoring unit 504 initializes a variable (tentative final status) by [post-status] of the previous power supply status notification (S2501). Then, the power supply status monitoring unit 504 checks the presence/absence of continuity based on the result of the above status transition continuity determination processing (S2502). If the presence of continuity is determined, the process advances to step S2508. On the other hand, if the absence of continuity is determined, the power supply status monitoring unit 504 determines whether or not [post-status] of the previous notification is a normal mode (S2503) so as to execute correction processing. If [post-status] is not a normal mode, the process jumps to step S2510. On the other hand, if [post-status] is a normal mode, the power supply status monitoring unit 504 determines whether or not [time period until power saving mode shift] information is appended to the previous power supply status notification, and [pre-status condition] of the current power supply status notification is [power saving mode] (S2504) as in step S1004, thereby selecting the method of the correction processing. If these conditions are satisfied, the process advances to step S2506; otherwise, the process advances to step S2505. Step S2505 is the same as step S1005. Step S2506 is the same as step S1006. Step S2507 is the same as step S1007.

The power supply status monitoring unit 504 determines whether or not [pre-status condition] of the current notification is a normal mode, and the variable (tentative final status) is a normal mode (S2510). If the conditions are not satisfied, the process advances to step S2508. On the other hand, if the conditions are satisfied, the power supply status monitoring unit 504 additionally records a log indicating transition to the normal mode at [presumed normal mode start time of current notification] in the power supply status log table (S2511). In this case, the log to be additionally recorded includes, for example, an MFP ID (that of the notification source), time (presumed normal mode start time of the current notification), status (normal mode), and tentative final status (=[normal mode]).

Then, the power supply status monitoring unit 504 sets a normal mode in the variable (tentative final status) (S2512). In step S2511, since at least the start time of the normal mode can be detected based on the status and condition of the current notification, the power supply status log table is updated so that the normal mode was started at that time.

Next, the power supply status monitoring unit 504 determines whether or not the value of the variable (tentative final status) is equal to [post-status] of the current power supply status notification (S2508). If the value of the variable (tentative final status) is equal to [post-status], a series of processes end. On the other hand, if the value of the variable (tentative final status) is not equal to [post-status], the power supply status monitoring unit 504 additionally records a log indicating transition to [post-status] of the current notification at the current notification time in the power supply status log table (S2509), thus ending a series of processes. In this case, the log to be additionally recorded includes, for example, an MFP ID (that of the notification source), time (current notification time), and status ([post-status] of the current notification).

That is, when a difference between the presumed time period calculated based on the number of job processing pages and job processing speed, and the processing time period calculated based on the collected start and end times of the collected job is equal to or larger than a prescribed value, a time calculated by subtracting the presumed time period from the job end time is set as the job start time.

[Status Transition Correction Processing Using Job Log]

Figure 20A:
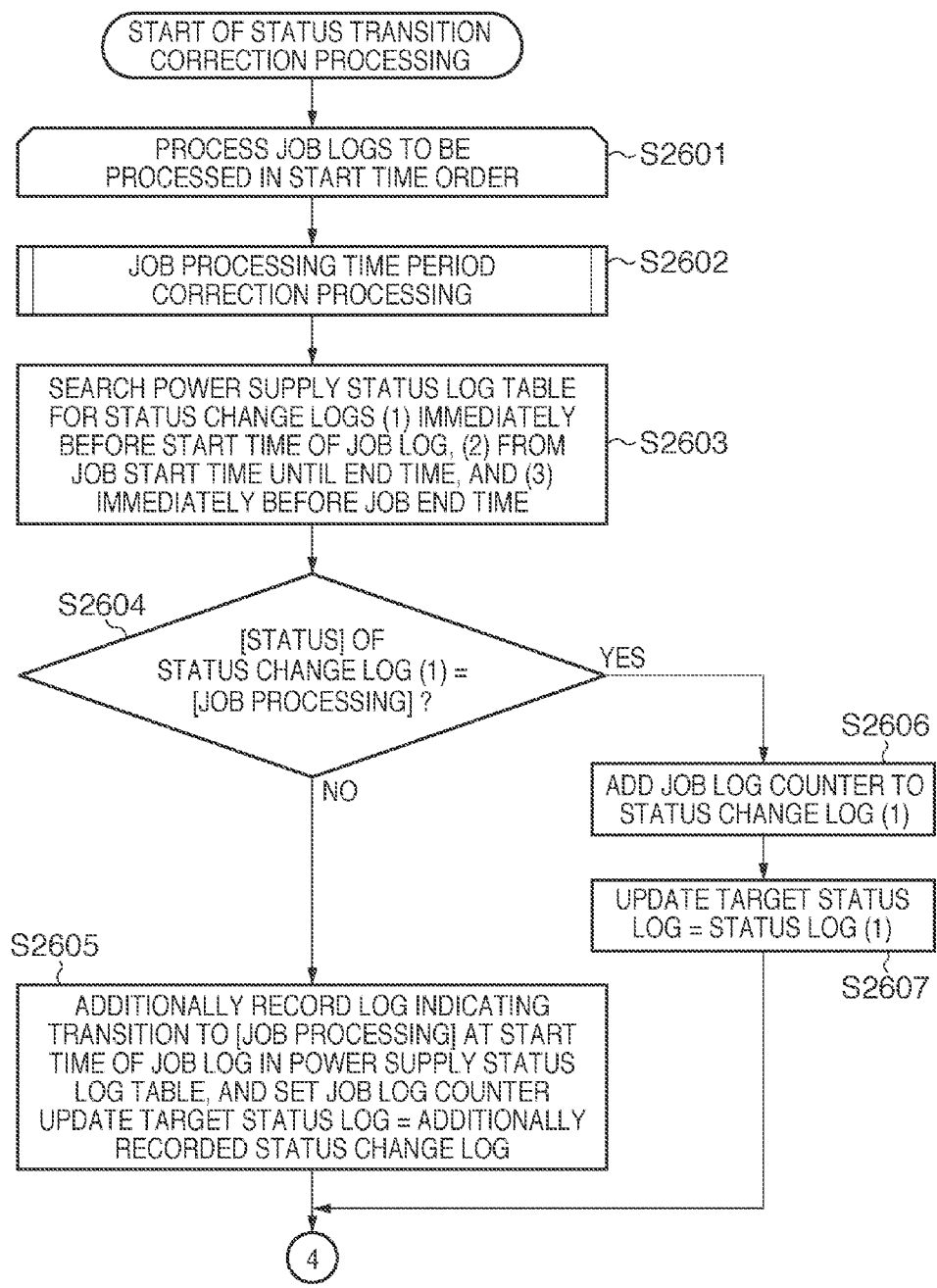
FIGS. 20A and 20B are flowcharts showing the overall processing sequence of status transition correction processing using job logs.
Figure 20B:
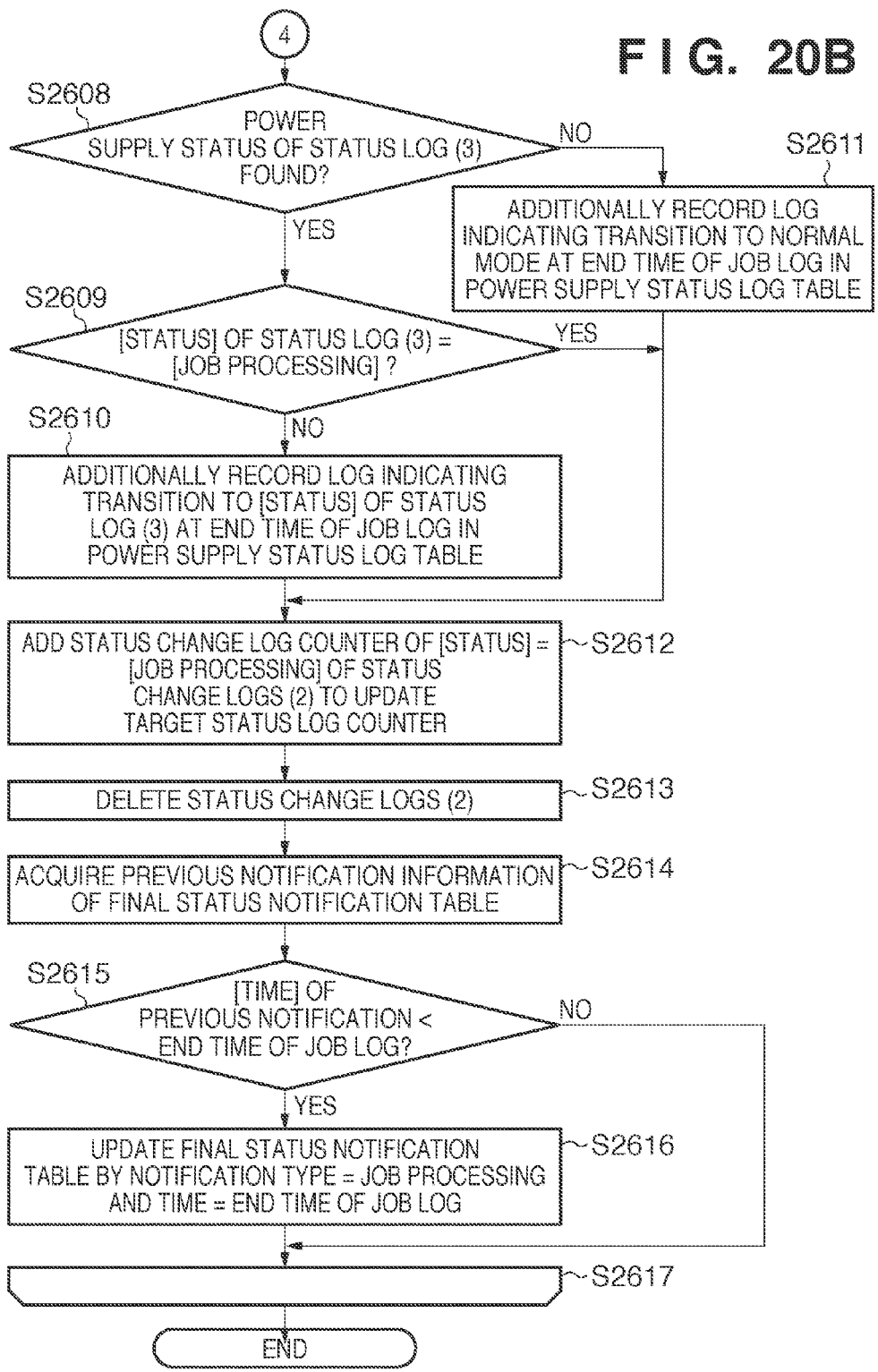

(Overall Processing Sequence (FIGS. 20A and 20B))

As status transition correction processing using job logs according to the second embodiment, that of the first embodiment (see FIGS. 13A and 13B) is expanded.

Figure 21:
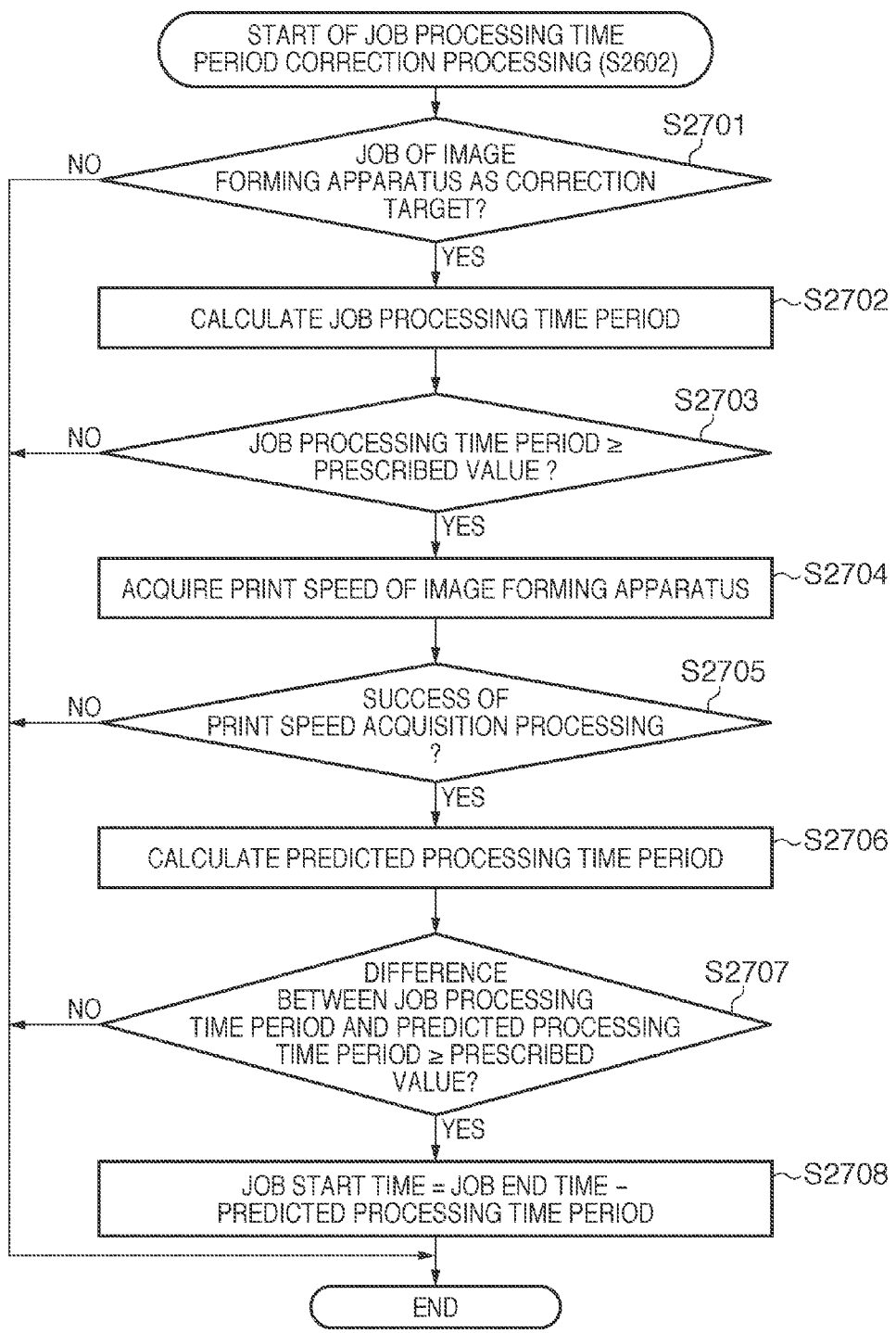
FIG. 21 is a flowchart showing the detailed processing sequence of job processing time period correction processing (S2602).

When the status transition correction processing using job logs starts, the sequence of processes in steps S2601 to S2617 is repeated for job logs to be processed in their start time order. The analysis processor 502 executes job processing time period correction processing first (S2602). Note that detailed processing in step S2602 will be described later using FIG. 21. As an overview of the processing in step S2602, when a job is suspended for a long time period due to an error such as out-of-paper or paper jam, since a time period between the job start and end times includes that in which the job was not processed, and a power consumption largely deviates, a job start time is adjusted to correct this deviation.

Step S2603 is the same as step S1102. The analysis processor 502 determines whether or not a status log (immediately before the job start time) exists and its [status] is equal to [job processing] (S2604) as in step S1103. If [status] is not equal to [job processing], the analysis processor 502 additionally records a log indicating transition to [job processing] at the start time of a job log in the power supply status log table (S2605). In this case, the log to be additionally recorded includes, for example, an MFP ID (that of the job log), time (start time of the job log), status (job processing), color print (the number of color print pages 706), monochrome print (the number of monochrome print pages 707), and scan (the number of scan pages 708). In the processing of step S2605, the analysis processor 502 sets a job log counter ([update target status log]=[additionally recorded status change log]). A difference from step S1104 lies in that the numbers of pages processed by a job are set in the color print column 2304, monochrome print column 2305, and scan column 2306 of the power supply status log table. Furthermore, the analysis processor 502 sets the additionally recorded status log in a variable (update target status log).

On the other hand, if it is determined in step S2604 that [status] is equal to [job processing], the analysis processor 502 adds the job log counter to a status change log in time period (1) (S2606). That is, the analysis processor 502 adds the number of color print pages 706 of the job log to the color print column 2304 of the status change log in time period (1). Likewise, the analysis processor 502 adds the number of monochrome print pages 707 to the monochrome print column 2305, and adds the number of scan pages 708 to the scan column 2306. Then, the analysis processor 502 sets the status log in time period (1) in the variable (update target status log) (S2607).

In step S2608, the same checking process as in step S1105 is executed. If a power supply status log of a status log in time period (3) (immediately before the job end time) does not exist, the analysis processor 502 additionally records a log indicating transition to the normal mode at the end time of the job log in the power supply status log table (S2611) as in step S1106.

On the other hand, if the power status log of the status log in time period exists, the analysis processor 502 determines whether or not [status] of the status log in time period (3) (immediately before the job end time) is equal to [job processing] (S2609) as in step S1107. If [status] is equal to [job processing], the process jumps to step S2612. On the other hand, if [status] is not equal to [job processing], the analysis processor 502 additionally records a log indicating transition to [status] of the status log in time period (3) at the end time of the job log in the power supply status log table (S2610) as in step S1108.

Then, the analysis processor 502 adds status change log counters (color print, monochrome print, and scan) of [status] =[job processing] of status change logs (from the job start time until the end time) to counters of the variable (update target status log) (S2612). The analysis processor 502 then deletes the status change logs in time period (2) (S2613) as in step S1109. Subsequently, the analysis processor 502 acquires previous notification information of a final state notification table (S2614) as in step S1110.

The analysis processor 502 determines whether or not [time] of the previous notification is before the end time of the job log (S2615) as in step S1111. If [time] is after the end time, the process jumps to step S2617. On the other hand, if [time] is before the end time, the analysis processor 502 updates the final status notification table by [notification type] =[job processing], [time]=[end time of job log] (S2616) as in step S1112. If all job logs to be processed have been processed (S2617), the status log correction processing using job logs ends.

(Detailed Processing Sequence (FIG. 21) of Job Processing Time Period Correction Processing (S2602))

When job processing time period correction processing starts, the analysis processor 502 determines whether or not a job log is that of a job processed by an image forming apparatus as a correction target (S2701). If it is determined that the job log is not that of the image forming apparatus as the correction target, the analysis processor 502 ends this processing without any job processing time period correction processing. On the other hand, if it is determined that the job log is that of the image forming apparatus as the correction target, the process advances to step S2702.

The checking process in step S2701 is executed to exclude a job log of an image forming apparatus whose job processing time period is hard to be predicted based on the numbers of print pages and print speeds. For example, a job log of an image forming apparatus whose job processing time period is hard to be predicted based on the numbers of print pages and print speeds like a large-format printer which requires a long ink dry time period every time one page is printed, is excluded from the correction target. The image forming apparatus as the correction target may be judged based on its model name. Subsequently, the analysis processor 502 calculates a job processing time period of the job log (S2702) using:

[Job processing time period (sec)]=[job end time]−
 [job start time]

The analysis processor 502 then determines whether or not the job processing time period of the job log is equal to or larger than a prescribed value (S2703). If it is determined that the job processing time period is smaller than the prescribed value, the analysis processor 502 ends this processing without any job processing time period correction processing. On the other hand, if it is determined that the job processing time period is equal to or larger than the prescribed value, the process advances to step S2704.

The checking process in step S2703 is executed to prevent a correct job processing time period from being erroneously corrected. For example, a job which has a small number of print pages (for example, 1 page) and a short job processing time period has a large occupation ratio of a warm-up processing time period such as image data creation to the full job processing time period. However, a processing time period, which is to be predicted based on the numbers of print pages and print speeds, does not consider any warm-up processing time period. That is, a job having a short job processing time period may often has a large difference between the job processing time period and predicted processing time period. Hence, in this embodiment, the prescribed value (for example, 30 min) is set in advance, and a job having a job processing time period shorter than the prescribed value is not corrected, thus effectively preventing a normal job processing time period from being erroneously corrected.

Subsequently, the analysis processor 502 acquires the print speeds of the image forming apparatus, which processed the job of the job log, from the device information management unit 505 (S2704). The analysis processor 502 then determines whether or not the print speed acquisition process in step S2704 has succeeded (S2705). If it is determined that the print speed acquisition process has failed, the analysis processor 502 ends this processing without any job processing time period correction processing. On the other hand, if it is determined that the print speed acquisition process has succeeded, the analysis processor 502 calculates a predicted processing time period of the job log (S2706). In this embodiment, the predicted processing time period is calculated by:

[Predicted processing time period (sec)]=60÷[monochrome print speed (pages/min)]×[number of monochrome print pages]+60÷[color print speed (pages/min)]×[number of color print pages]

Then, the analysis processor 502 determines whether or not a time difference between the job processing time period calculated in step S2702 and the predicted processing time period calculated in step S2706 is equal to or larger than a prescribed value (S2707). If it is determined that the time difference between the job processing time period and predicted processing time period is smaller than the prescribed value, the analysis processor 502 ends this processing without any job processing time period correction processing. On the other hand, if the time difference between the job processing time period and predicted processing time period is equal to or larger than the prescribed value, the process advances to step S2708.

The checking process in step S2707 is executed to determine whether or not an error has occurred during the job processing time period of the job. A time period in which the image forming apparatus purely executed job processing has a difference from the predicted processing time period calculated in step S2706. For this reason, the analysis processor 502 calculates a difference between the job processing time period and predicted processing time first. When the calculated difference is small, it is determined that no error occurred in a time period between the job start time and job end time of the job, and the job processing time period is correct.

On the other hand, when the calculated difference is large, it is determined that an error has occurred during the job processing time period of the job, and the job processing time period includes a halt time due to the error. In this embodiment, the prescribed value is set in advance (for example, a value three times or more the calculated job processing time period), and when the calculated difference is equal to or larger than the prescribed value, it is determined that an error has occurred during the job processing time period of the job.

The analysis processor 502 corrects [job start time] of the job to [corrected job start time]=[job end time]−[predicted processing time period] (S2708), thus ending this processing.

[Processing Sequence of Power Supply Status Ratio Table Update Processing (not Shown)]

Figure 14:
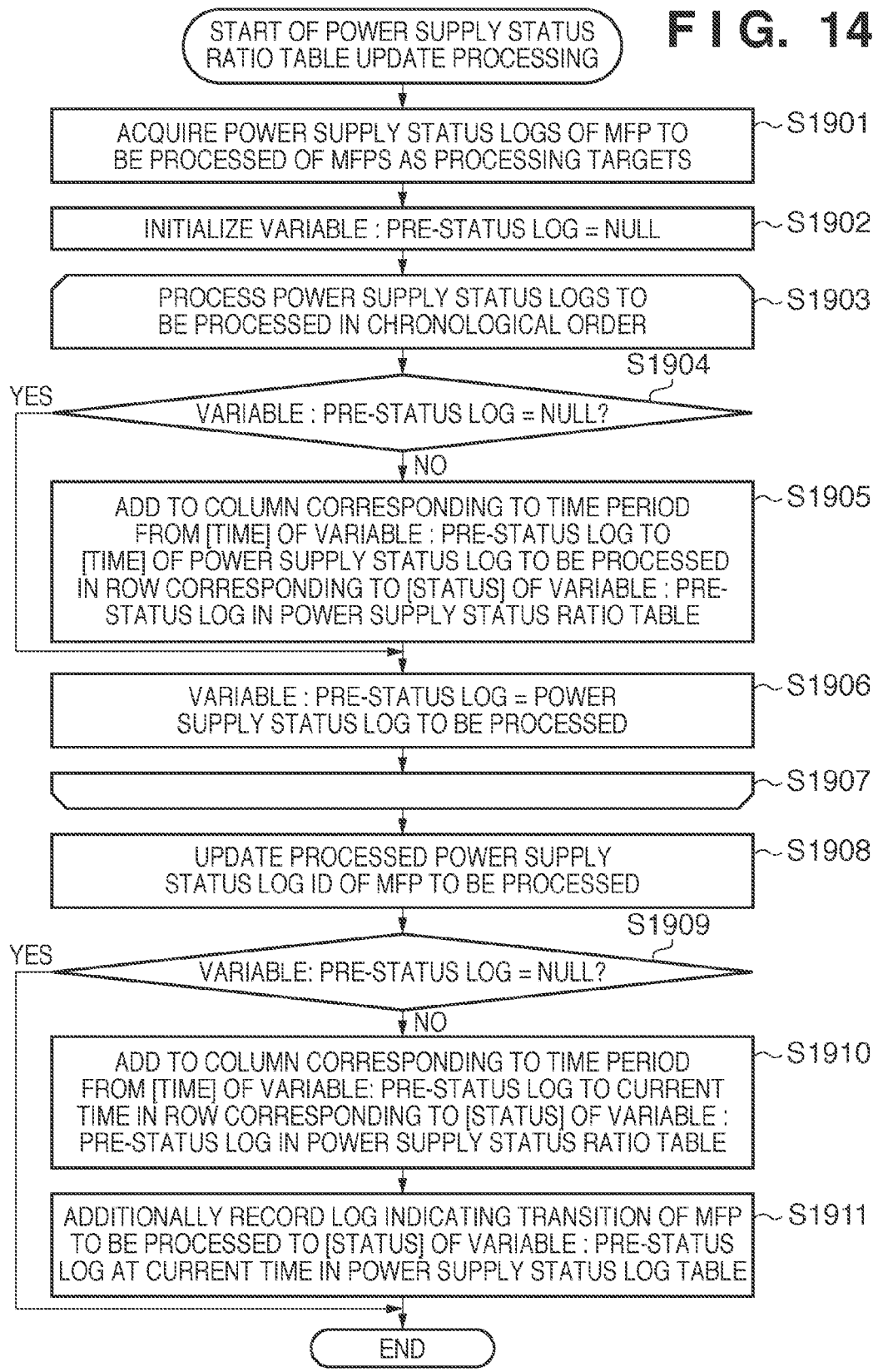
FIG. 14 is a flowchart showing the processing sequence of power supply status ratio table update processing.

The second embodiment expands the power supply status ratio table update processing of the first embodiment (FIG. 14). In steps S1905 and S1910, the analysis processor 502 calculates a power consumption correction amount using [color print], [monochrome print], and [scan] of the variable (pre-status log) with reference to the aforementioned power consumption correction table (FIG. 17B) using:

[Processing time period]=[current time or [time] of processing target status log]−[[time] of variable (re-status log)]

When [color print]+[monochrome print]≥1

[Power consumption correction amount]=[print job processing 2004]×[processing time period]+ [print first page 2102]+[color print]×[color print (Wh/page) 2103]+[monochrome print]×[monochrome print (Wh/page) 2104]+[scan]×[scan (Wh/page) 2105]

When [color print]+[monochrome print]=0

[Power consumption correction amount]=[print-less job processing 2005]×[processing time period]+ [scan]×[scan (Wh/page) 2105]

The analysis processor 502 distributes the power consumption correction amounts calculated using the above equations to corresponding time zones, and adds them to respective columns of the power consumption correction amount 1605.

[Power Consumption Analysis Processing (not Shown)]

The second embodiment modifies the graph creation method in the power consumption analysis processing according to the first embodiment (see FIG. 15B) as follows. For respective statuses of the power supply status ratio table, power consumptions of respective statuses of an MFP of interest are acquired from the power consumption table for respective power supply statuses shown in FIG. 17A. Then, power consumption amounts for respective statues in respective time zones are calculated by multiplying the acquired power consumptions by accumulated time periods. However, as for a power consumption during job processing, the power consumption correction amount 1605 is used. In this way, since power consumption amounts are calculated in consideration of whether or not job processing includes print processing, and the numbers of color print pages, monochrome print pages, and scan pages, the power consumptions can be calculated with higher precision. Although not shown, information indicating the relationship between power consumptions and carbon dioxide emissions may be stored, and a carbon dioxide amount emitted by an MFP may be calculated and displayed based on the calculated power consumptions.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-070855, filed Mar. 25, 2010 which are hereby incorporated by reference herein in their entirety.

What is claimed is:

1. A device management system in which a device which is allowed to shift to a power saving mode and a management apparatus which manages the device are connected to a network, said system comprising:

a power supply status notification unit configured to notify the management apparatus of a power supply status including information indicating whether or not a power supply of the device is ON and information indicating whether or not an operation mode of the device is a power saving mode;

a power supply status monitoring unit configured to identify, based on a power supply status notification received from the device, a time at which the power supply of the device shifted to a different status and a time at which the operation mode of the device shifted to a different mode;

a power supply status log recording unit configured to record, in a first memory, a power supply status log including the shift time to the different state or the different operation mode and a power supply status after the shift time;

a job log recording unit at the device configured to record, in a second memory, a job log including a start time and an end time of a job executed by the device;

a job log collection unit configured to be arranged in the management apparatus and issue a job log acquisition request to the device;

a job log sending unit configured to send job log information recorded in the second memory to the management apparatus in response to the job log acquisition request from the management apparatus; and an update unit configured to additionally record, in the first memory, a log indicating that a status shifted to a status of job processing at the start time of the job and shifted to a status before the start time of the job at the end time of the job.

2. The system according to claim 1, further comprising:

a status transition condition table configured to record in advance a pre-status and a post-status of the power supply status notification for each type of the power supply status notification;

a continuity determination unit configured to determine, based on said status transition condition table, that power supply status notifications have continuity in a case that a pre-status of a received power supply status notification is included in a post-status of a previous power supply status notification, and that power supply status notifications do not have any continuity in a case that the pre-status of the received power supply status notification is not included in the post-status of the previous power supply status notification; and a power supply status correction unit configured to correct a power supply status log in a case that said continuity determination unit determines that the power supply status notifications do not have any continuity.

3. The system according to claim 2, wherein said power supply status correction unit corrects the power supply status log to indicate that a status changed to the pre-status of the received previous power supply status notification at a reception time of the previous power supply status notification.

4. The system according to claim 3, wherein said power supply status notification unit periodically notifies the management apparatus of active power supply statuses, and notifies the management apparatus of a time period until the operation mode shifts to the power saving mode in an active power supply status notification and a power supply status notification in a case that the power saving mode is canceled, and in a case that said continuity determination unit determines that power supply status notifications do not have any continuity, the post-status of the previous power supply status notification is a normal mode, and the pre-status of the received power supply status notification is a power saving mode, said power supply status correction unit additionally records, in the power supply status log, a log indicating shift to the power saving mode at a time obtained by adding the time period until the operation mode shifts to the power saving mode to the reception time of the previous power supply status notification.

5. The system according to claim 1, further comprising:
a device information acquisition unit configured to acquire a job processing speed from the device,
wherein said job log recording unit records a job log which includes a start time and an end time of a job executed by the device and the number of job processing pages processed according to the job, and
said update unit further records the number of job processing pages collected from the device by said job log collection unit, and in a case that a difference between a presumed time period calculated based on the number of job processing pages and the job processing speed, and a processing time period calculated based on the start time and the end time of the job collected by said job log collection unit is not less than a prescribed value, said update unit sets a time obtained by subtracting the presumed time period from the end time of the job as a start time of the job.

6. The system according to claim 1, wherein in a case that a power supply status notification is not received from the device, said update unit records a log indicating that the device is set in a normal mode during time zones other than time zones of job processing.

7. The system according to claim 1, further comprising:
a power supply status accumulated time period calculation unit configured to calculate accumulated time periods of time periods in which the device is in respective power supply statuses in time zones designated based on the power supply status log recorded by said power supply status log recording unit.

8. The system according to claim 7, further comprising:
a power consumption table configured to record in advance power consumptions when the device is in respective power supply statuses; and
a power consumption amount calculation unit configured to calculate Power consumption amounts by multiplying the power consumptions when the device is in respective power supply statuses and accumulated time periods in the respective power supply statuses.

9. The system according to claim 8, further comprising:
a power consumption amount display unit configured to display power consumption amounts for respective power supply statuses of the device in the designated time zones.

10. The system according to claim 8, wherein said job log recording unit further records a job type,
said update unit records the job type together with a power supply status log of job processing,
said power consumption table records in advance a power consumption amount of the job processing corresponding to the job type, and
said power consumption amount calculation unit calculates a power consumption amount by acquiring a power consumption amount corresponding to the job type recorded by said power supply status log recording unit from said power consumption table.

11. The system according to claim 8, further comprising:
a power consumption correction table configured to record in advance a power consumption amount per page,
wherein said job log recording unit records the number of job processing pages processed according to the job,
said update unit records the number of job processing pages together with the power supply status log of the job processing, and
said power consumption amount calculation unit calculates a power consumption correction amount by multiplying the power consumption amount per page acquired from said power consumption correction table by the number of job processing pages, and adds the power consumption correction amount to power consumptions of the device.

12. The system according to claim 11, wherein said job log recording unit records the number of print pages or the number of scan pages processed according to the job, and
said update unit records the number of print pages or the number of scan pages together with the power supply status log of the job processing.

13. The system according to claim 11, wherein said job log recording unit records the number of color print pages, the number of monochrome print pages, or the number of scan pages processed according to the job, and
said update unit records the number of color print pages, the number of monochrome print pages, or the number of scan pages together with the power supply status log of the job processing.

14. The system according to claim 12, wherein the power consumption correction table records in advance a power consumption correction amount to be added in a case that a first page is printed, and
said power consumption amount calculation unit adds the power consumption correction amount to power consumptions of the device in a case that a print job is executed.

15. The system according to claim 4, further comprising:
a device information acquisition unit configured to acquire, from the device, a time-out time period as a time period until the normal mode shifts to the power saving mode,
wherein in a case that the pre-status of the received power supply status notification and the post-status of the previous power supply status notification include a normal mode, and in a case that a time obtained by adding the time-out time period to a time of the previous power supply status notification is before a time obtained by subtracting a normal mode duration, which is obtained by subtracting a time period until the operation mode shifts to the power saving mode of the received power supply status notification from the time-out time period, from a time of the received power supply status notification, said continuity determination unit determines that the power supply status notifications do not have any continuity, and said power supply status correction unit corrects a power supply status log by a log indicating that the operation mode shifted to the power saving mode at a time obtained by adding the time-out time period to the reception time of the previous power supply status notification.

16. A management apparatus which is connected, via a network, to a device comprising a job log recording unit configured to record, in a first memory, a job log including a start time and an end time of an executed job, and manages the device, said apparatus comprising:

a power supply status monitoring unit configured to receive, from the device, a power supply status notification indicating a power supply status including information indicating whether or not a power supply of the device is ON and information indicating whether or not an operation mode of the device is a power saving mode, and to identify a time at which the power supply of the device shifted to a different status and a time at which the operation mode of the device shifted to a different mode;

a power supply status log recording unit configured to record, in a second memory, a power supply status log including the shift time to the different status or the different operation mode and a power supply status after the shift time;

a job log collection unit configured to collect job logs recorded in the first memory by issuing a job log acquisition request to the device; and an update unit configured to additionally record, in the second memory, a log indicating that a status shifted to a status of job processing at a start time of the job, and shifted to a status before the start time of the job at an end time of the job.

17. A management apparatus which is connected, via a network, to a device which is allowed to shift to a power saving mode, and manages the device, said apparatus comprising:

a recording unit configured to acquire, from the device, a power supply status including information indicating whether or not a power supply of the device is ON and information indicating whether or not an operation mode of the device is a power saving mode, and to record, in a memory, a power supply status log including a time at which the power supply of the device shifted to a different status or a time at which the operation mode of the device shifted to a different mode and a power supply status after the shift time; and an update unit configured to acquire, from the device, a job log including a start time and an end time of a job executed by the device, and to additionally record, in the memory, a log indicating that a status shifted to a status of job processing at the start time of the job and shifted to a status before the start time of the job at the end time of the job.

18. A device management method of a device management system in which a device which is allowed to shift to a power saving mode and a management apparatus which manages the device are connected to a network, the method comprising:

a power supply status notification step of notifying the management apparatus of a power supply status including information indicating whether or not a power supply of the device is ON and information indicating whether or not an operation mode of the device is a power saving mode;

a power supply status monitoring step of identifying, based on a power supply status notification received from the device, a time at which the power supply of the device shifted to a different status and a time at which the operation mode of the device shifted to a different mode;

a power supply status log recording step of recording, in a first memory, a power supply status log including the shift time to the different state or the different operation mode and a power supply status after the shift time;

a job log recording step of recording, in a second memory at the device, a job log including a start time and an end time of a job executed by the device;

a job log collection step of issuing a job log acquisition request to the device;

a job log sending step of sending job log information recorded in the second memory to the management apparatus in response to the job log acquisition request from the management apparatus; and an update step of additionally recording, in the first memory, a log indicating that a status shifted to a status of job processing at the start time of the job and shifted to a status before the start time of the job at the end time of the job.

19. A non-transitory computer-readable storage medium storing a program for controlling a computer to function, in a device management system in which a device which is allowed to shift to a power saving mode and a management apparatus which manages the device are connected to a network, as:

a power supply status notification unit configured to notify the management apparatus of a power supply status including information indicating whether or not a power supply of the device is ON and information indicating whether or not an operation mode of the device is a power saving mode;

a power supply status monitoring unit configured to identify, based on a power supply status notification received from the device, a time at which the power supply of the device shifted to a different status and a time at which the operation mode of the device shifted to a different mode;

a power supply status log recording unit configured to record, in a first memory, a power supply status log including the shift time to the different state or the different operation mode and a power supply status after the shift time;

a job log recording unit configured to record, in a second memory at the device, a job log including a start time and an end time of a job executed by the device;

a job log collection unit configured to issue a job log acquisition request to the device;

a job log sending unit configured to send job log information recorded in the second memory to the management apparatus in response to the job log acquisition request from the management apparatus; and an update unit configured to additionally record, in the first memory, a log indicating that a status shifted to a status of job processing at the start time of the job and shifted to a status before the start time of the job at the end time of the job.

* * * * *